United States Patent
Prince

(10) Patent No.: US 9,605,142 B2
(45) Date of Patent: Mar. 28, 2017

(54) LOW DENSITY HIGH IMPACT RESISTANT COMPOSITION AND METHOD OF FORMING

(71) Applicant: REVOLUTIONARY PLASTICS, LLC, Las Vegas, NV (US)

(72) Inventor: Jack Raymond Prince, West Bountiful, UT (US)

(73) Assignee: REVOLUTIONARY PLASTICS, LLC, Las Vegas, NV (US)

( * ) Notice: Subject to any disclaimer, the term of this patent is extended or adjusted under 35 U.S.C. 154(b) by 0 days.

(21) Appl. No.: 14/360,556

(22) PCT Filed: Nov. 27, 2012

(86) PCT No.: PCT/US2012/066641
§ 371 (c)(1),
(2) Date: May 23, 2014

(87) PCT Pub. No.: WO2013/082024
PCT Pub. Date: Jun. 6, 2013

(65) Prior Publication Data
US 2014/0309320 A1    Oct. 16, 2014

Related U.S. Application Data

(60) Provisional application No. 61/564,566, filed on Nov. 29, 2011, provisional application No. 61/609,117, filed on Mar. 9, 2012, provisional application No. 61/653,899, filed on May 31, 2012, provisional application No. 61/682,133, filed on Aug. 10, 2012.

(51) Int. Cl.
| | |
|---|---|
| C08L 23/06 | (2006.01) |
| C08J 3/22 | (2006.01) |
| C08K 13/02 | (2006.01) |
| C08J 9/00 | (2006.01) |

(52) U.S. Cl.
CPC .............. *C08L 23/06* (2013.01); *C08J 3/226* (2013.01); *C08J 9/0014* (2013.01); *C08J 9/0061* (2013.01); *C08J 9/0066* (2013.01); *C08K 13/02* (2013.01); *C08J 2201/024* (2013.01); *C08J 2323/08* (2013.01); *C08J 2323/20* (2013.01); *C08J 2451/06* (2013.01); *C08J 2453/02* (2013.01); *C08J 2491/00* (2013.01)

(58) Field of Classification Search
None
See application file for complete search history.

(56) References Cited

U.S. PATENT DOCUMENTS

| | | | |
|---|---|---|---|
| 3,981,840 A | 9/1976 | Yamamoto et al. | 260/42 |
| 4,198,327 A | 4/1980 | Matsumoto et al. | 260/4 |
| 4,243,575 A | 1/1981 | Myers et al. | 260/37 PC |
| 4,661,533 A | 4/1987 | Stobby | 521/122 |
| 4,898,620 A | 2/1990 | Rayfield et al. | 106/464 |
| 5,177,139 A | 1/1993 | Klaar et al. | 524/484 |
| 5,296,420 A | 3/1994 | Garvie | 501/105 |
| 5,302,634 A | 4/1994 | Mushovic | 523/219 |
| 5,369,147 A | 11/1994 | Mushovic | 523/219 |
| 5,508,315 A | 4/1996 | Mushovic | 521/122 |
| 5,552,455 A | 9/1996 | Schuler et al. | 523/137 |
| 5,604,266 A | 2/1997 | Mushovic | 521/122 |
| 5,639,531 A | 6/1997 | Chen et al. | 428/49 |
| 6,110,855 A | 8/2000 | Moorhead et al. | 501/127 |
| 6,153,670 A | 11/2000 | Skelhorn | 523/210 |
| 6,242,098 B1 | 6/2001 | Styron et al. | 428/402 |
| 6,269,952 B1 | 8/2001 | Watt et al. | 209/3 |
| 6,344,268 B1 | 2/2002 | Stucky et al. | 428/317.9 |
| 6,362,252 B1 | 3/2002 | Prutkin | 523/200 |

(Continued)

FOREIGN PATENT DOCUMENTS

| | | | |
|---|---|---|---|
| AU | 2003 235 021 | 3/2004 | C08K 3/36 |
| EP | 0640650 | 3/1995 | C08L 23/16 |

(Continued)

OTHER PUBLICATIONS

Barnes et al., "Ash Utilisation from Coal-Based Power Plants," UK Department of Trade and Industry commissioned study, Jan. 2006 (30 pgs).
Eurocoalash Conferences 2008 and 2010, downloaded from http://www.ecoba.com/eurocoalash.html, May 2, 2011 (1 pg).
Berghahn, M., "Smart fly ash solutions," Evonik Industries, Science-to-Business Center Eco$^2$, Eurocoalash May 28, 2010 (20 pgs).
PolyOne Corporation 2011 Annual Shareholder Meeting, downloaded from http://www.khq.com/story/14525597/polyone-corporation-2011-annual-shareholder-meeting, May 2, 2011 (1 pg).
RockTron Story, downloaded from http://rktron.com/company-history, Apr. 30, 2011 (2 pgs).
RockTron Legal Information, downloaded from http://rktron.com/legal-information, May 2, 2011 (2 pgs).

(Continued)

*Primary Examiner* — Jeffrey Mullis
(74) *Attorney, Agent, or Firm* — Hayes Soloway P.C.

(57) ABSTRACT

One or more fly ash materials or other optimized mineral fillers having a particle size distribution that may include cinders of selected sizes is mixed to form a filler. The filler is then mixed with an acid scavenger, an antioxidant, a compatibilizer and an impact modifier into a resin to form either a final composition or a masterbatch. A blowing agent may be added to both. Either the masterbatch or the final composition is mixed with a blend of a mineral oil and a styrenic block copolymer. Thereafter the masterbatch if prepared is mixed into or with a base resin to form the final composition. Fractional melt may be used in the masterbatch and in the final composition. The physical properties of the resulting products can be controlled by varying the ingredients. Some masterbatches are combined to produce products that have improved impact strength and/or that have enhanced toughness when compared to products made using naked or virgin resins. Alternately, the blowing agent may be added just before processing the composition into a final product.

7 Claims, 13 Drawing Sheets

(56) References Cited

U.S. PATENT DOCUMENTS

| | | | |
|---|---|---|---|
| 6,379,797 B1 | 4/2002 | Nikkeshi et al. | 428/403 |
| 6,391,082 B1 | 5/2002 | Holl | 75/230 |
| 6,583,217 B1 | 6/2003 | Li et al. | 524/650 |
| 6,669,773 B2 | 12/2003 | Malloy et al. | 106/705 |
| 6,695,902 B2 | 2/2004 | Hemmings et al. | 106/284.05 |
| 6,828,372 B2 | 12/2004 | Sullivan et al. | 524/449 |
| 6,916,863 B2 | 7/2005 | Hemmings et al. | 523/218 |
| 7,195,473 B2 | 3/2007 | Sullivan et al. | 425/140 |
| 7,241,818 B2 | 7/2007 | Hemmings et al. | 523/218 |
| 7,879,939 B2 | 2/2011 | Prince et al. | 524/442 |
| 8,106,105 B2 | 1/2012 | Cernohous | 521/83 |
| 8,419,405 B2 | 4/2013 | Prince et al. | 425/148 |
| 8,563,629 B2 | 10/2013 | Prince et al. | 523/351 |
| 2002/0016224 A1 | 2/2002 | Pasqua, Jr. et al. | 473/376 |
| 2002/0040084 A1 | 4/2002 | Colmar et al. | 524/430 |
| 2002/0124775 A1 | 9/2002 | Hemmings et al. | 106/273.1 |
| 2002/0157799 A1 | 10/2002 | Sachs et al. | 164/4.1 |
| 2002/0171164 A1 | 11/2002 | Halterbaum et al. | 264/53 |
| 2003/0032707 A1 | 2/2003 | Hemmings et al. | 524/425 |
| 2003/0092816 A1 | 5/2003 | Mehta et al. | 524/445 |
| 2003/0130399 A1* | 7/2003 | Mehta et al. | 524/445 |
| 2003/0167973 A1 | 9/2003 | Peev et al. | 106/802 |
| 2004/0144287 A1 | 7/2004 | Tardif et al. | 106/705 |
| 2004/0266933 A1 | 12/2004 | Friedman et al. | 524/442 |
| 2005/0163969 A1 | 7/2005 | Brown | 428/151 |
| 2005/0171243 A1 | 8/2005 | Hemmings et al. | 523/218 |
| 2006/0058427 A1 | 3/2006 | O'Neill et al. | 523/319 |
| 2006/0099405 A1 | 5/2006 | Guiselin et al. | 428/323 |
| 2006/0167217 A1* | 7/2006 | Okada et al. | 528/380 |
| 2006/0276088 A1 | 12/2006 | DeWesse | 442/59 |
| 2007/0051277 A1 | 3/2007 | Hill et al. | 106/638 |
| 2007/0142534 A1 | 6/2007 | Moad et al. | 524/445 |
| 2007/0160788 A1* | 7/2007 | Wurtzel | B32B 1/02 428/35.7 |
| 2008/0029925 A1 | 2/2008 | Brown | 264/166 |
| 2008/0110378 A1 | 5/2008 | Hill et al. | 106/374 |
| 2008/0114112 A1* | 5/2008 | Hemmings et al. | 524/425 |
| 2008/0119578 A1 | 5/2008 | Prince et al. | 521/91 |
| 2008/0131344 A1 | 6/2008 | Hill et al. | 423/238 |
| 2008/0139704 A1 | 6/2008 | Gregory et al. | 524/60 |
| 2008/0306198 A1 | 12/2008 | Zucchelli et al. | 524/394 |
| 2009/0087509 A1 | 4/2009 | Linares | 425/130 |
| 2009/0130443 A1 | 5/2009 | Lustiger | 428/401 |
| 2009/0258777 A1 | 10/2009 | Tardif et al. | 501/53 |
| 2010/0016459 A1 | 1/2010 | Cernohous | 521/146 |
| 2010/0119751 A1 | 5/2010 | Lanier | 428/36.9 |
| 2010/0256281 A1 | 10/2010 | Palama | 524/423 |
| 2011/0071252 A1 | 3/2011 | Prince et al. | 524/567 |
| 2011/0130501 A1 | 6/2011 | Prince et al. | 524/147 |
| 2011/0144243 A1 | 6/2011 | Prince et al. | 524/65 |
| 2011/0178198 A1 | 7/2011 | Backer et al. | 521/149 |
| 2012/0015161 A1* | 1/2012 | Todt et al. | 428/198 |
| 2013/0274387 A1* | 10/2013 | Zwick | B65D 19/0026 524/94 |
| 2014/0151924 A1 | 6/2014 | Prince et al. | C08L 23/06 |
| 2014/0228498 A1 | 8/2014 | Prince et al. | 524/433 |

FOREIGN PATENT DOCUMENTS

| | | | |
|---|---|---|---|
| GB | 2478696 | 9/2011 | B60C 1/00 |
| JP | 2000-226473 | 5/2000 | C08K 9/04 |
| JP | 2005-068305 | 3/2005 | C08L 101/00 |
| WO | WO 99/34973 | 7/1999 | B32B 5/16 |
| WO | WO9937592 | 7/1999 | C04B 14/00 |
| WO | WO 2009136185 | 11/2009 | C08K 3/00 |
| WO | WO 2012121970 | 9/2012 | C08J 3/22 |
| WO | WO 2013043454 | 3/2013 | C08L 101/00 |

OTHER PUBLICATIONS

The RockTron Management Team, downloaded from http://rktron.com/management-team-2, Apr. 30, 2011 (1 pg).

RockTron Collaboration & Innovation, downloaded from htt://rktron.com/r-d-collaboration, Apr. 30, 2011 (1 pg).

RockTron Product Ranges, downloaded from http://rktron.com/products, Apr. 30, 2011 (2 pgs).

RockTron Technology Overview, IGEM 2010 (Part 1—20 pgs).

RockTron Technology Overview, IGEM 2010 (Part 2—20 pgs).

RockTron Technology Overview, IGEM 2010 (Part 3—20 pgs).

Smith, I.M., "Cement and concrete—benefits and barriers in coal ash utilisation, CCC/94." Jan. 1, 2005, abstract downloaded from http://bookshop.iea-coal.org/reports/ccc-94/81179 (1 pg).

Brennan, P., "Processing of Fly Ash—New Developments," Eurocoalash 2010, Copenhagen—May 28, 2010, Evonik Industries (Part 1—10 pgs).

Brennan, P., "Processing of Fly Ash—New Developments," Eurocoalash 2010, Copenhagen—May 28, 2010, Evonik Industries (Part 2—10 pgs).

Brennan, P., "Processing of Fly Ash—New Developments," Eurocoalash 2010, Copenhagen—May 28, 2010, Evonik Industries (Part 3—9 pgs).

International Search Report and Written Opinion issued in corresponding application No. PCT/US2012/066641, dated Feb. 18, 2013 (10 pgs).

International Preliminary Report on Patentability issued in corresponding application No. PCT/US2012/066641, dated Jun. 3, 2014 (9 pgs).

Brandup et al., Polymer Handbook, $4^{th}$ edition, John Wiley & Sons, 1999, p. V/16.

"Wanted Waste: Fly Ash", Chemistry & Industry (London, United Kingdom), Mar. 8, 2010, pp. 24-26.

Deepthi, et al. "Mechanical and thermal characteristics of high density polyethylene-fly ash Cenospheres composites", Material and Design, vol. 31, pp. 2051-2060 (2010).

GRT-Pozzolans, Material Safety Data Sheet of Class C fly ash, Jan. 8, 2014.

Huang et al., "Processed Low NOx Fly Ash as a Filler in Plastics", Journal of Minerals & Materials Characterization & Engineering, vol. 2, No. 1, pp. 11-31, 2003.

Office Action issued in U.S. Appl. No. 14/344,043 dated Jan. 15, 2015, 14 pgs.

Office Action issued in U.S. Appl. No. 14/002,629 dated Mar. 18, 2015, 17 pgs.

Office Action issued in U.S. Appl. No. 14/002,629 dated Sep. 17, 2015.

Notice of Allowance issued in U.S. Appl. No. 14/344,043 dated Jun. 30, 2015.

Notice of Allowance issued in U.S. Appl. No. 14/002,629 dated Nov. 19, 2015.

Rocktron Technology Overview, IGEM 2010 (Part 4—18 pages).

Extended European Search Report issued in EP Appln. No. 10 819 302.0 dated Sep. 14, 2016, 12 pgs.

* cited by examiner

LOW DENSITY HIGH IMPACT RESISTANT COMPOSITION AND METHOD OF FORMING

BACKGROUND OF THE INVENTION

1. The Field

A composition is disclosed in which a dry powder or liquid blowing agent is mixed into either a base blend or a liquid mixture. The base blend is formed of one or more dry mineral fillers such as mechanically processed fly ash. Thereafter, the other ingredients are added to the base blend and compounded to form a masterbatch or to form a fully compounded material both of which are processed at a temperature at which the blowing agent is not activated. More specifically, an acid scavenger, an antioxidant, a suitable carrier resin, a particle compatibilizer and an impact modifier may be mixed with the dry filler blend to form a masterbatch that is thereafter combined with a base resin (which may be the same as the carrier resin) and an additional low or fractional melt resin to form the fully compounded material. Alternately, all the ingredients may be combined at once to form the fully compounded material. Also, alternately, the composition may be formed as a mixture without the blowing agent; and the dry powder blowing agent is thereafter mixed in as that mixture is heated into liquid form just before mechanical processing into a product. The final product after mechanical processing is less dense while having an impact resistance equal to or greater than the impact resistance of a similar product formed from a base resin having a blowing agent mixed therein.

2. The Relevant Technology

A plastic like polyethylene and/or polypropylene is typically selected for desired physical properties, some of which can be controlled using additives that include, among others, colorants, lubricants, stabilizers, foaming agents and various fillers. Traditionally, fillers have been used to lower the cost of a composition and in turn the resulting product because expensive resin is being replaced by less expensive filler. Specific fillers called reinforcing fillers are also known to be used to alter some of the physical properties of the base resin, such as tensile and flexural strength, hardness, impact resistance, shear and other rheological and morphological characteristics of the resulting compounded material. Blowing agents have also been used to reduce the amount of resin used but also to control physical properties such as the density of the finished product.

It is known that one may add a blowing agent in the process of manufacturing a product while the compounded material is in liquid form. When the blowing agent is activated in the manufacturing process, the blowing agent produces a gas which in turn makes the liquid resin and resulting solid material less dense. In other words, less resin is used to form essentially the same product thereby reducing the amount of compound and in turn base resin used to form a particular product due to the formation of gas filled bubbles or pockets within the product.

Fillers and blowing agents are also known to have some effect on processing characteristics of thermoplastic resins while molten. For example, unfilled polymers behave like non-Newtonian fluids with viscosity changing during melt processing. Some additives affect the rheology except that increasing the amount of the filler (regardless of the shape of the particles of the filler) has been reported to lead to reduced melt elasticity. M. Xanthos, *Functional Fillers For Plastics* (Wiley-VCH 2005) pp. 32-35.

Fly ash, cinders and combinations of fly ash and cinders have been identified as fillers that can be used with resins in a beneficial manner as disclosed in U.S. Pat. No. 7,879,939 (Prince et al.) (hereinafter the '939 patent).

Fly ash is a waste material that is comprised of various minerals which are the residue formed during the combustion of hydrocarbons like coal, typically in large volume processes like those associated with the generation of electrical power. As the coal is burned, a residue or "ash" is formed that is so light that it can be regarded as buoyant in air. The fly ash may include cinders formed during coal combustion. The cinders are typically made from fused or other non combustible matter that was part of the coal. Large cinders typically fall to the bottom in the combustion zone or area. Some smaller or lighter cinders can become entrained in the exhaust stream along with fly ash.

Fly ash, as well as the cinders, can vary in chemical and physical properties based on, among other things, the specific source of the hydrocarbon being combusted and the particulars of the combustion process. In turn, fly ash, by itself and also together with cinders, has not been used as a filler for thermoplastic compositions on a commercial scale because physical and chemical properties are not consistent.

To create a standard or consistent fly ash composition that is suitable for use on a commercial scale with thermoplastic resins, U.S. Patent Application Publication No. 2011/0071252 published Mar. 24, 2011 (the '252 Publication) for a "SYSTEM AND METHOD FOR FORMING A COMPOSITION WITH AN OPTIMIZED FILLER" discloses methods and procedures to select or form an optimized filler or blend of fillers. In other words, fly ash, with and without cinders, can be mechanically treated and blended or otherwise mixed to form a filler or blend of fillers that is useful in forming thermoplastic compositions as disclosed in the '939 patent.

It is known to use certain fillers with thermoplastic resins to alter the toughness or impact resistance properties for the manufacture of a wide variety of products. But it has not been known how to formulate such products that are both tough and less costly to manufacture and how to formulate to vary the physical properties such as the toughness while reducing cost and reducing density by use of blowing agents.

BRIEF SUMMARY

A dry mineral filler in powder form such as at least one or more fly ash materials having a plurality of ash particles and optionally, a blowing agent in powder form, are mixed together to form a base blend. The base blend is then mixed with a base resin such as a thermoplastic base resin along with a fractional or low melt resin, a compatibilizer, and an oil-softened styrenic block co polymer either in such quantities to form a masterbatch for further combination with base resin and/or fractional or lower melt resin or to form, with sufficient base resin and fractional or low melt resin, the desired composition. Alternately, all the ingredients except the blowing agent are combined to form a mixture or final compound that is heated to liquid form for mechanical processing into a product. The blowing agent is injected or mixed into the mixture in liquid form before the composition is formed into a product.

Preferably, the compatibilizer is selected to assist in the interconnectivity of the particles of the dry mineral filler, such as the particles of the fly ash, with the thermoplastic base resin. The compatibilizer can be a maleated polyolefin or a liquid silane. A carrier resin may be grafted with maleic anhydride having a melt flow index selected to encapsulate a plurality of particles of the mineral filler such as fly ash particles. To form a masterbatch, the materials are mixed with a base resin and/or fractional melt resin having selected physical properties. Alternately the desired composition is formed using sufficient base resin and/or fractional melt resin.

The mineral filler such as fly ash is selected or mechanically processed so that it has small particles in the submicron (less than 1 micron) to smaller micron range (less than about 10 microns) to enhance foaming via nucleation of the gas bubbles as they are forming. That is, it has been learned that the above stated particle sizes contribute to or facilitate the excellent dispersion and distribution of the filler particles when combined with blowing agent and then compounded into a masterbatch or a fully formulated pellet. It has also been found that any other combination of fillers "optimized for flowability" or combination of fillers containing particles sufficient to nucleate gas bubbles create a distribution of small cells in structural foam applications.

Also disclosed is a method of forming compositions from a blending of a base resin with a masterbatch that includes a filler formed from fly ash as noted above, along with a carrier resin, an antioxidant, an acid scavenger, and optionally, a compatibilizer and also optionally an oil-softened styrenic block copolymer. Of course a blowing agent is included either in dry form or liquid form when blending with the filler or as a powder or a liquid when it is inserted into the melted composition immediately before product formation.

BRIEF DESCRIPTION OF THE DRAWINGS

To further clarify the above and other advantages and features of the present disclosed compositions and methods, a more particular description will be rendered by reference to the appended drawing. It should be understood that the drawing depicts only typical embodiments and therefore is not to be considered limiting of the scope of the appended claims. More specifically:

DESCRIPTION

The compositions as disclosed include a combination of ingredients one of which is a foaming agent to produce a material or product that is less dense while retaining improved physical characteristics such as hardness and toughness over resins made only with the foaming agent.

Figure 1:
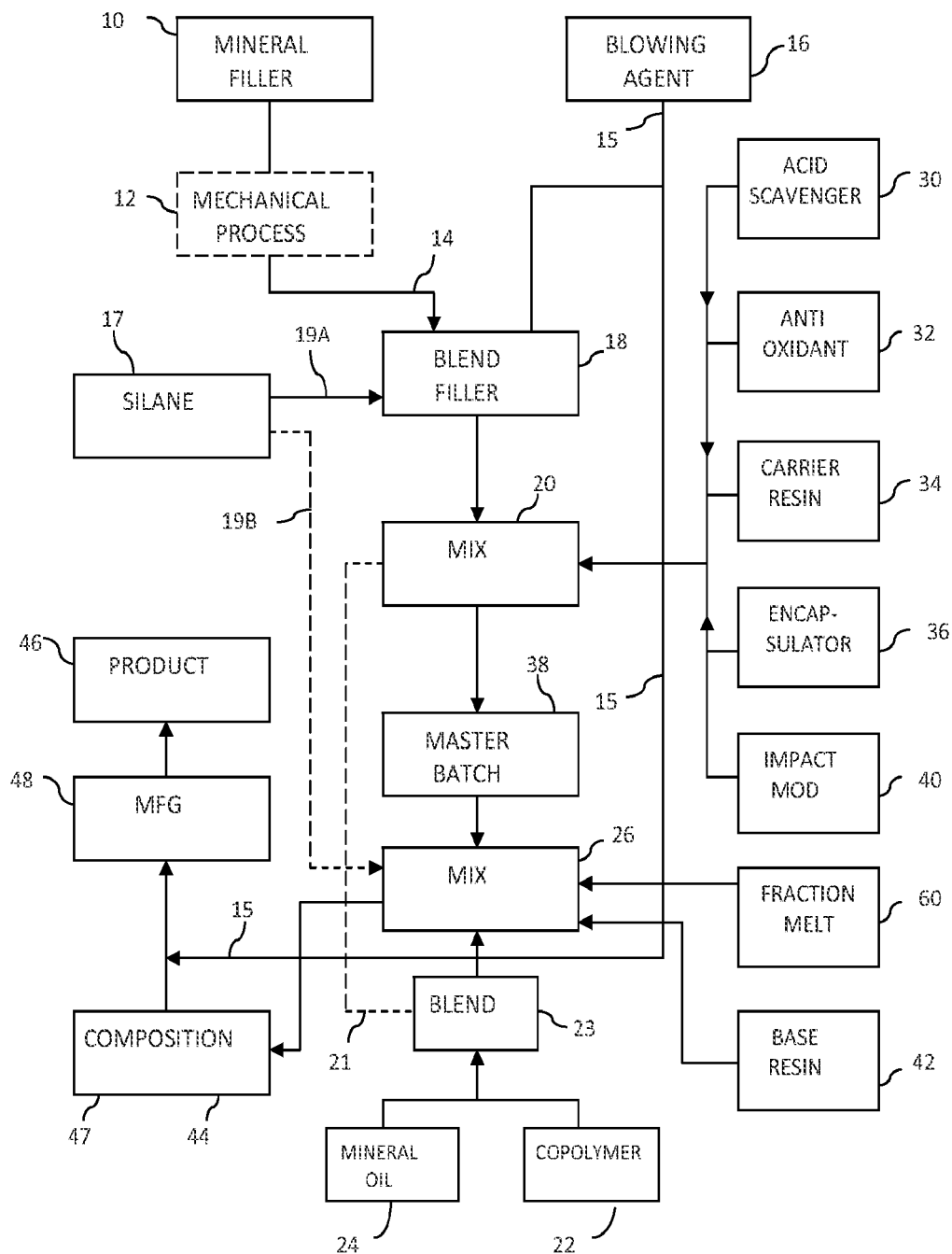
FIG. 1 is a diagram of the steps and ingredients used to form a composition as herein disclosed.

FIG. 1 illustrates a typical process for forming the desired compositions exemplified by the data from examples set forth hereinafter. It should also be understood that the drawing and the examples are not intended to limit the scope of the disclosure or the appended claims. Rather, alternatives, modifications and equivalents are within the spirit and scope of this disclosure and the appended claims.

Certain thermoplastic resins are selected to manufacture products that will exhibit desired physical properties. Some products need to be soft or flexible while others need to be tough and hard. Polyethylene and polypropylene are typically selected for products that need to have good impact resistance (toughness) and good tensile and flexural strength (stiffness). Such materials and their equivalents are typically used without fillers or similar additives.

One example of unmodified thermoplastic resin is generally known as "no break" polypropylene copolymer. The compositions of the present invention can dramatically increase impact resistance with comparable or better tensile strength and flexural strength using a high density polyethylene (HDPE) thermoplastic resin which is less expensive than the "no break" polypropylene copolymer while using a foaming agent to reduce the density and in turn the amount of HDPE used to produce a comparable product without a foaming agent.

In the manufacture of plastic products, a suitable thermoplastic resin is melted to form a melt into which other ingredients are mixed. That composition is further melt-processed by molding, extruding, calendaring, and the like, into a final physical plastic shape using any one of several machines including, for example, vacuum molding machines, extrusion machines and injection molding machines. Speed of manufacture is always an economic consideration so long as the process speed does not adversely affect later performance (i.e., physical properties of the product). For example, when using injection molding machines to form a desired product with resin to form a composition not modified as herein discussed, the cycle time may not be as fast as desired and the cooling time may be longer than preferred. Cycle time is significant because a faster cycle time means more product is made within a given unit of time. That increased rate or volume can translate into more products using the same number of machines or fewer machines with the same production. In turn, this means that the capital investment may be reduced or controlled so that the cost of manufacture is reduced.

Also, faster cooling time means less space is needed for holding product while cooling and in turn less cost associated with establishing and maintaining necessary manufacturing space.

The process of FIG. 1 leads to the formation of a composition that, when compared with unmodified thermoplastic resin used commercially, has significantly improved impact resistance or toughness properties including, in some cases, improved comparable tensile strength and flexural strength properties. As will be discussed hereinafter, the physical properties of the compositions formed and more particularly the polyethylene compositions formed using the disclosed processes can be controlled so some desired compositions have significantly increased impact characteristics while using materials that lead to lower material costs and, in some cases, faster cycle times.

It may also be noted that the compositions being formed as disclosed in connection with FIG. 1 involve use of any suitable mineral filler in powder form. While a variety of minerals such as calcium carbonate may be used, other mineral material may also be used that would otherwise be considered waste or residue. For example, fly ash materials are regarded as a waste by-product of combustion. In turn, it can be seen that forming compositions as herein disclosed using fly ash has environmental benefits in that the fly ash is being converted from a waste material to material that has a beneficial use consistent with and promoting sustainability principles.

As seen in FIG. 1, a mineral filler 10 is provided which is mechanically processed 12 by filtering (to remove, for example, larger undesired components and/or demagnetizing as desired to form a mineral powder 14. In preferred applications, the mineral filler is a fly ash material that is formed from one or more fly ash materials that approach or approximate an optimized fly ash filler.

When the mineral filler is fly ash, the mechanical process may involve filtering to remove large cinders and other impurities. Typically the output of mechanical processing yields fly ash in which the largest particle is less than about 900 microns in effective diameter or in which the largest particle is about 180 microns in effective diameter consistent with suitable mechanical processing devices selected by the user. Of course a large quantity of small sized material that is less than 1 micron may also be found passing through the mechanical process 12. The mechanical process 12 may also include demagnetizers to remove magnetic particles like iron. Mechanical processing 12 is optional; so it is shown by a dotted line in FIG. 1.

The fly ash from a source is provided as a mineral filler 10 and may be suitable by itself after appropriate mechanical processing 12 and optional demagnetization 12. A fly ash will be deemed suitable if it meets a desired mechanical structure (in the form of a fine material or powder) or particle size distribution that has been empirically found to produce desired results in the final product. A fly ash may even include cinders of selected sizes in some cases.

If a particular fly ash being supplied does not meet the specifications desired, it can be combined with one or more other fly ash materials that differ in particle size distribution and possibly in other ways. Each can be suitably mechanically processed and optionally demagnetized 12. Thereafter the fly ash from multiple sources can be combined or blended in a fashion as disclosed in U.S. Patent Application Publication No. 2011/0071252 published Mar. 24, 2011 (the '252 Publication). Fly ash from multiple sources also can be blended empirically or heuristically to produce a blend or filler 18 that is suitable for use based on the experience of the operator. That is, an operator with experience may be able to look at and feel (to determine whether it is fine or coarse and contains cinders) a plurality of fly ash materials and decide how to mix them and in what ratio to produce an adequate blend or filler that approximates or approaches the optimal blend. An adequate blend can be used in some applications to produce products that are acceptable to the end user.

While the mineral filler 10 is presently entirely fly ash, it should be understood that other minerals may be used and that additives can be supplied to be blended into or with the filler. For example, colorants could be added at this early stage as well as other dry materials that may be desirably mechanically mixed or blended with the fly ash. As seen in FIG. 1, a foaming agent 16 may be added in powder or liquid form.

As seen in FIG. 1, the foaming agent 16 is supplied to and mixed directly with the filler 18 in a mechanical blending device to form the filler blend 18.

In some cases a compatibilizer such as a liquid silane 17 coupling agent may be added 19A to the blend of mineral filler 18 and foaming agent or blowing agent 16. The amount of liquid silane used is so small or limited that it can be added to the dry fly ash and mixed or blended to produce the filler blend 18, without otherwise affecting the processing properties of the filler blend 18. That is, the blended filler 18 is still in powder form. The term "compatibilizer" is a term coined or used here to mean that the material is believed to make the association of the fly ash particles with the carrier resin more compatible and in effect facilitates their encapsulation as discussed hereinafter.

As seen in FIG. 1, the blended filler 18 is then mixed with an acid scavenger 30, an antioxidant 32, a thermoplastic carrier resin 34, an encapsulator or compatibilizer 36 (if not otherwise provided) and a fractional or low melt index resin serving as the impact modifier 40. The blended filler 18, the acid scavenger 30 and the antioxidant 32 are mixed 20 into the melted carrier resin 34 and the compatibilizer 36, which acts to encapsulate the particles of the blended filler 18, in suitable quantities along with a fractional or low melt index resin which functions as an impact modifier 40 to form the masterbatch 38.

Optionally, but preferably, minor amounts of stabilizing additives can be added to the masterbatch 38. An acid scavenger 30 like hydrotalcite is introduced into the masterbatch 38 in small quantities to reduce the acid that can form when mixing the blended filler 18 and other materials to form the masterbatch 38. An antioxidant 32 may be a benzene material such as ANOX® NDB® blend available from Chemtura and is introduced to minimize the oxidation when mixing the masterbatch 38. Chemtura has offices throughout the world with offices in Middlebury, Conn. ALKANOX® is a phosphorous based antioxidant that can be used and is available also from Chemtura and may be used as an antioxidant. Combinations of ANOX® and ALKANOX® antioxidants may be used as well.

The impact modifier 40 is a fractional melt resin that has a melt flow index (MFI) at or below 2 and typically a melt flow index of less than 1, as measured using ASTM D1238. The impact modifier 40 may even be recycled plastic or waste production called "regrind", adding to the sustainability features of the invention. Typically, the impact modifier 40 selected is lower in cost than the base resin 42 while maintaining comparable physical properties for the product 46 to those if the base resin 42 was used without the impact modifier 40. Marlex® HHM 5202 high density polyethylene and Marlex® HHM 5502 high density polyethylene (HDPE) available from Chevron Phillips Chemical Company of Woodlands, Tex. have been found to be particularly suitable as an impact modifier.

Styrenic block copolymer, such as SEPTON® copolymer may also function as an impact modifier 40. SEPTON® copolymer comes in pellet form and can be added directly into the masterbatch 38 as it is being mixed 26. SEPTON® copolymer also comes in flake form (such as SEPTON® 4033) which should be combined or blended 23 with a mineral oil 24 in order for the SEPTON® copolymer 22 to melt sufficiently at normal extrusion temperatures used to melt-process the masterbatch 38 and/or base resin. The amount of oil used to combine with the SEPTON® 4033 affects the elasticity of the masterbatch 38 and even the final composition 44. Different amounts and kinds of mineral oil can be used to control the elasticity. The use of a blend 23 of SEPTON® 4033 and mineral oil typically in a 90/10 ratio is preferred.

Inasmuch as the filler blend 18 is a mineral composite and may be a ceramic or ceramic-like material in particulate form (e.g., a powder) among molten thermoplastics, it is believed to be important that each particle of the filler blend 18 be at least partially coated, and ideally totally encapsulated. At present, total encapsulation of the particles is believed to be accomplished by a compatibilizer, such as the liquid silane 17 identified, or preferably by a functionalized polyolefin compatible with the base resin and reactive with or capable of physical association with the surface of each fly ash particle. A polyolefin grafted with maleic anhydride, also called a maleated polyolefin, with a melt flow index sufficiently low to facilitate some coating of the fly ash particles is preferred because it is believed that the wetting of the fly ash particles is enhanced when it is heated and mixed with the filler particles. Polybond®3009 compatibilizer, which is also sold by Chemtura, is a maleated HDPE that has been found to be particularly suitable as the carrier resin 34 for the masterbatch 38 to form the desired compositions.

Without being limited to a particular theory, it is believed that the fly ash particles couple with, and effect a covalent bond with, the Polybond® 3009 material. At the same time, the Polybond® 3009 is believed to function as a compatibilizer between the particles and the base resin 42 to enhance the mixing with, and dispersion of the particles into, the base resin 42. It is also believed that the Polybond® 3009 acts as a compatibilizer for the various base resins 42 being used in the final composition 44, helping them to have a more effective blending of different resin types. As an alternate to the maleic-anhydride-modified high density polyethylene, a maleic anhydride grafted oil, maleic anhydride grafted liquid monomer or a maleic anhydride grafted liquid polymer maybe used to coat as much of the surfaces of the particles of the filler 18 as possible. A small portion (2% to 5%) of the liquids (like an oil or a liquid polymer) can be used to coat the particles by blending them in a suitable blender like a Henschel high intensity blender or a continuous flow ribbon blender in the process of forming the masterbatch 38.

As seen in FIG. 1, the masterbatch 38 is supplied for further mixing 26 with a base resin 42. The base resin 42 can be considered a "target" resin because it is recognized that the masterbatch 38 is being formulated or formed to be mixed with it by a manufacturer in the final melt shaping of a product 46 by any recognized production device 48 (e.g., injection molding, flow molding, extruding, vacuum molding). That is, the base resin 42 is combined with the masterbatch 38 to form the composition 44 that is used in the manufacture 48 of a product 46. The base resin 42 may be any suitable polyethylene. ExxonMobil 6605.70 HDPE (0.948 Density; 5 g/10 min MFI); Dow DMDA-8007 NT 7 HDPE (0.965 Density; 8.3 g/10 min. MFI); and Marlex 9708 HDPE (0.962 Density; 8 g/10 min.MFI) have been found suitable as a base resin 42 in the samples tested to date as discussed hereinafter.

A suitable mineral oil 24 is mixed with a high performance stryrenic block copolymer 22. The resulting blend 23 softens and enhances the flowability of the composition 44 when in melt form as it is mixed 26 while contributing to the strength and elasticity of the final product 46. That is, the base resin 42 and the masterbatch 38 create a composition in melt form that could wet the surfaces of the processing equipment and reduce the production cycle time or throughput time. Adding the blend 23 of the mineral oil 24 and the copolymer 22 contributes to the flowability of the composition 44 and is also believed to contribute to the toughness of the product 46. In practice, it has been found that SEPTON® 4033 flakes available from Kuraray America, Inc. of Houston, Tex. are particularly useful as the copolymer 22. Hydrobite® 550 PO white mineral oil offered by Sonneborn, LLC of Mahwah, N.J. has been found to be particularly useful as the mineral oil 24. In use, it has been found that the blend 23 is best when mixed in a ratio of about nine units of copolymer to one unit of oil 24. Other similar mineral oils such as Penreco® Drakeol® mineral oil are also believed to be suitable for use.

The masterbatch 38 is typically converted to pellets or a similar solid mechanical shape as an intermediate product and transported to a location selected for preparing the composition 44, which can be the final product or also another intermediate product, depending on the type of processing equipment used to make the composition 44. The quantities of filler blend 18, acid scavenger 30, antioxidant 32, carrier resin 34 and compatibilizer 36 are selected such that when the masterbatch 38 is mixed with pre-selected amounts of the base resin 42, the desired amount of blended filler 18 is introduced into, dispersed within, and constantly maintained within the composition 44.

The masterbatch 38 is typically in a dry solid form such as pellets, and the base resin 42 is also typically in a dry solid form such as pellets. The masterbatch 38 and the base resin 42 can be mixed to form a dry blend using a dry pellet blender like one made by Maguire Products Inc. of Aston, Pa. The dry blend of materials is effectively the composition 44 that is introduced into a suitable manufacturing machine 48, like an injection molding machine.

In some applications, the base resin 42 along with the masterbatch 38 are melted and blended or mixed 26 with the blend 23 to foam the composition 44 of any conceivable finally shaped form. As identified previously, "no break" polypropylene copolymer (COPP) is an unmodified thermoplastic resin. HDPE compositions of the invention, as shown in the examples below, are effective and advantageous replacements for such COPP resins presently being evaluated for use in the manufacture of wheeled carts which are also recognized by homeowners and others as wheeled trash cans in multiple sizes ranging from about 30 gallons in size up to about 100 gallons in size. Such wheeled trash cans must be extremely durable, tough, stiff, and strong in repeated usage in various climates and weather conditions over a number of years.

It may be noted that the use of fractional or low melt resin 60 as an impact modifier 40 beneficially affects the overall cost of the composition 44. The fractional melt 60 is believed to be available at a price that is less than the price of the base resin 42. While fractional melt materials are being used as the impact modifier 40, it should be understood that other low melt index (melt flow index (MFI) less than about 2 or 3) materials should be also suitable for use as the impact modifier 40. Further, one can use reprocessed or reground sources as the impact modifier 40, further lowering the cost of the resulting composition 44. Reprocessed or "regrind" may be used for the base resin as well as fractional and low melt resins used in forming the compositions 44 as evident from the various samples or examples that follow in Tables 2-21 hereinafter.

Of course, it may be noted that the masterbatch 38 contains a notable portion and sometimes a weight majority of fly ash as blended filler 18. Fly ash and fly ash with cinders are products of combustion and otherwise considered a waste or residue as hereinbefore stated. Use of a blended filler 18 in the composition 44 further lowers its cost because the blended filler 18 replaces or reduces the amount of base resin 42 used in forming a particular product. In other words, a waste material, namely, fly ash (and sometimes fly ash with cinders), is being converted from a waste that must be disposed of (e.g., like transported to a land fill) to a beneficial use that not only eliminates the waste but also reduces the amount of expensive resin used in forming a particular product while enhancing desired physical properties. Further, it has been noted that the use of fly ash as a blended filler 18 increases the flowability of the masterbatch 38 and the composition 44 so that less energy is needed to pump the composition in the manufacturing process leading to significant savings in energy over time. Similarly some compositions are made with a heat or melt index that is lower than neat resin so that less energy is needed to heat and melt the resin and in turn leading to less time to cool. In turn the manufacturing process can be faster. That is, the cycle time to form one product is reduced.

Notwithstanding the use of fractional or lower melt index materials as the impact modifier and the use of a substantial amount of filler blend 18, it has been noted that the mechanical characteristics of the resulting product(s) 46 are comparable to the unmodified thermoplastic resins currently commercially used, and in many cases better than those resins. In other words, use of the filler 18 with the impact modifier 40 leads to savings in energy and savings in material because one is using less resin while using or consuming a waste material like fly ash. At the same time, the resulting product has physical properties that are the same as or better than the naked or pure resin.

Alternately, the foaming agent 16 or blowing agent may not be added to the blend filler 18. Rather the foaming agent 16 is supplied for direct incorporation with the composition 44. In turn the material formed into a masterbatch 38 has all the same ingredients except for the foaming agent 16. While FIG. 1 shows the foaming agent 16 being supplied for incorporation with the composition 47 from the mixing 26 via line 15, it should be understood that the foaming agent 16 may be mixed into the composition 44 in liquid form or into the material supply portion of a machine that is heating the composition 44 in the manufacturing process 48.

Testing was undertaken by following steps in a sequence that is believed to be required to achieve the desired results. First the mineral filler 10 was selected to be fly ash which is processed by suitable mechanical means 12 like sifting and demagnetization. A foaming agent 16 is also selected to be in powder form and then blended using procedures to optimize the particular particle size distribution that is less than about 900 microns in effective diameter. The foaming agent 16 and the mineral filler 10 (fly ash) are combined to form the filler blend 18. Liquid silane 17 in small quantities may be supplied 19A as a separate ingredient to the mix 26 as hereinafter discussed. The amount of silane 17 added is so small that it does not impact on the physical form of the filler blend 18. That is, the filler blend remains a powder. The liquid silane 17 may also be added optionally as shown by dotted line 19B.

The carrier resin 34 can also be regarded as or function as a compatibilizer 36. However a separate compatibilizer 36 is preferred. The carrier resin 34, the compatibilizer 36, and the impact modifier 40 are melted and mixed together 20 along with an acid scavenger 30, one or more antioxidants 32 and the blend filler 18 in forming the masterbatch 38. Notably an impact modifier 40 can also be mixed with the final composition as desired.

Based on test results to date, it is believed that the blended filler 18 may be from about 0.2% percent to about 95 percent by weight of the masterbatch 38. The acid scavenger 30 may be from about 0.1 percent to about 10 percent by weight of the masterbatch and the antioxidant 32 may be from about 0.2 percent to about 1.0 percent by weight of the masterbatch 38. The carrier resin 34 that also functions as a compatibilizer may be from about 15 to about 70 percent by weight of the masterbatch 38. The impact modifier 40 may be from about 10 to about 40% by weight of the masterbatch 38. In normal practice, the materials are melt-mixed 20 and then extruded as pellets for further processing when re-melted and mixed 26 with other materials to form the composition 44 as hereinafter discussed.

In some applications, the copolymer/oil blend 23 is added either for mixing 26 to form the composition 44 or via line 21 for mixing 20 to form the masterbatch 38. The blend 23 is formed by first mixing a mineral oil 24 with the copolymer to form a blend 23 that is in a flake form. The blend 23 is about 60-95% of the copolymer 22 and from about 5 to about 300% mineral oil 24 (or a ratio as high as 3 parts oil to 1 part copolymer or as low as 20 parts copolymer to 1 part oil) 22 which is heated or melted to form the blend 23 that is optionally added to the mix 20 or to the mix 26. But in all cases, the copolymer 22 and oil must first be mixed to form the blend 23, an oil-softened styrenic block copolymer.

The masterbatch 38 as an intermediate product which is a concentrate. The ratio of materials is selected to be in suitable proportion to be added to or mixed with the base resin 42 to form the composition 44. The composition 44 can have from about 1 percent to about 70 percent by weight of the masterbatch with the remainder being base resin 42. In some applications, a separate supply of low melt index or fractional melt material 60 can be added in lieu of base resin 42. In some applications, the amount of fractional melt 60 or low melt index material may be from about 1 to about 35 percent by weight of the composition while the base resin 42 can be from about 20 to about 98 percent by weight of the composition 44.

Table 1 following shows the composition of six different materials (Masterbatches I-VI) which function as the masterbatch 38 without a blowing agent or foaming agent like blowing agent 16. That is, the blowing agent 16 is supplied via line 15 directly to the composition 44 as it is being heated for mechanical processing (e.g., injection molding).

The Masterbatches I-VI were used to prepare samples of a composition 44 that are numbered 1-64. As seen in Table 1, Masterbatches I-VI all include a mineral filler 10 which is a fly ash blend called Blend B supplied by Revolutionary Plastics, LLC of Las Vegas, Nev. Masterbatch I is a composition that is available from Poly One Corporation of Avon Lake, Ohio and was used in the formation of base line materials used for comparison discussed here after. Comparative Examples A, F, J, L and T are controls of a base resin 42. Comparative Examples R and S are controls of fractional melt resins.

Masterbatches II-VI in Table 1 can also be seen to include an acid scavenger which functions as the acid scavenger 30 discussed hereinbefore. It also shows use of an antioxidant that functions as the antioxidant 32 discussed hereinbefore. Masterbatches III-VI all use a blend to function as the blend 18 that is supplied for mixing 20 to form the masterbatch 38. The blend 23 is formed of 4.5% Septon and 0.5% mineral oil. Stated alternately, the blend 23 is 90% Septon and 10% mineral oil. Masterbatches IV-VI can also be seen to include different kinds of fractional melt materials as shown. The Masterbatches II-VI as well as Comparative Examples B and C and Examples or samples 1-71 were all prepared by mixing the various ingredients at about 232° C. in an injection molding machine; except that the blend 23 was pre-mixed before being added.

It may be noted that MasterBatches I-VI do not include the foaming agent 16. That is, the foaming agent is not introduced via line 15 to the composition 47 before or as it is being mechanically processed. It has been the industry practice to develop and test resins and compositions before foaming and to compare the test results of such resins and compositions before foaming using a blowing agent. Applicant believes that the industry practice is to assume that any change in physical characteristic of a resin or composition experienced before foaming using a blowing agent will lead to similar changes in the foamed material after foaming. Thus one may compare a resin with a composition and note a change in, for example, the Notched Izod impact test (ASTM Test D256), from about 3 to about 12. After foaming or addition and activation of the blowing agent of the same resin and composition, a relative or comparable change or increase in the Notched Izod test results is expected and obtained even though no measurements or tests are normally or typically performed on the foamed material to confirm what is empirically observed.

In order to demonstrate the improvements including the ability to vary physical parameters as discussed herein before, a number of base resins and a number of samples were prepared to demonstrate the physical parameters of the various compositions and base resins all without blowing agent added. The following Tables 2-10 show the physical composition of the base resins tested and the physical composition of 71 samples. Tables 11-21 show the results of tests which show physical parameters or characteristics of the base resins and samples. In Tables 2-21, the capital letters (e.g., "A") are for base resins and numbers (e.g., "1, 2, 3") are for test samples. In some cases, the numbers are followed by a letter like sample 1 A and 52 B purely for administrative convenience. The compositions are each different upon comparison of the ingredients.

The same letters and numbers are used for the same materials throughout Tables 2-21. Thus, for example, capital "C" in Table 2 refers to a base resin that is formed by mixing 50% of a particular Exxon Mobil base resin as shown with 30 percent of Marlex material as indicated used as an impact modifier and 20% of the Masterbatch I from Table 1. As another example, the number "2" refers to a composition that includes 50% of an ExxonMobil base resin as shown along with 28.5% of Marlex as shown and 21.5% of Masterbatch III. From time to time, different base resins were tested and/or retested to confirm and/or reconfirm results. Thus, base resin A and base resin F are in fact what is sometimes referred to as virgin or neat resin and are the same material, but tested at different times. Base resin B and C are compositions that use Masterbatch I to show other base resin compositions that cannot attain the benefits that evolve in the other key tested samples.

In reference to Tables 2-21, some tables are vertically longer and are shown with a part A and B. The individual columns for each such Table continue from part A to part B.

TABLE 1

MASTERBATCH MATERIALS

| Ingredient | I | II | III | IV | V | VI |
|---|---|---|---|---|---|---|
| Eclipse Fly Ash Blend B (Revolutionary Plastics, Las Vegas, NV) | 75 | 70 | 70 | 70 | 70 | 70 |
| Chevron TR935 MDPE | 23.8 | | | | | |
| Hydrotalcite acid scavenger | 0.5 | 0.5 | 0.5 | 0.35 | 0.35 | 0.35 |
| Chemtura Anox NDB antioxidant | 0.35 | 0.35 | 0.35 | 0.245 | 0.245 | 0.245 |
| Chemtura Alkanox antioxidant | 0.35 | 0.35 | 0.35 | 0.245 | 0.245 | 0.245 |
| Chemtura PolyBond 3009 maleated polyethylene (0.95 Density; 3-6 g/10 min. MFI) | | 28.8 | 14.4 | 5 | 5 | 5 |
| Kuraray Septon 4033 SBC Flakes | | | 12.96 | 4.5 | 4.5 | 4.5 |
| Sonneborn 550 Mineral Oil | | | 1.44 | 0.5 | 0.5 | 0.5 |
| Marlex HHM 5202BN HDPE (0.951 Density; 0.35 g/10 min. MFI) | | | | 19.16 | | |
| Marlex HHM 5502BN HDPE (0.955 Density; 0.35 g/10 min. MFI) | | | | | 19.16 | |
| Westlake EN1807AA HDPE (0.921 Density; 0.7 g/10 min. MFI) | | | | | | 19.16 |
| Total | | 100 | 100 | 100 | 100 | 100 |

TABLE 2

|  | Example (Wt. %) | | | | | | | |
| --- | --- | --- | --- | --- | --- | --- | --- | --- |
|  | A | B | C | 1 | 1A | 1B | 2 | F |
| ExxonMobil 6605.70 HDPE (0.948 Density; 5 g/10 min MFI) | 100 | 80 | 50 | 45 | 78.5 | 50 | 50 | 100 |
| Marlex HHM 5202BN HDPE (0.951 Density; 0.35 g/10 min. MFI) |  |  | 30 | 28.5 |  | 28.5 | 28.5 |  |
| Kuraray Septon 4033 SBC Flakes |  |  |  | 4.5 |  |  |  |  |
| Sonneborn 550 Mineral Oil |  |  |  | 0.5 |  |  |  |  |
| Masterbatch I |  | 20 | 20 |  |  |  |  |  |
| Masterbatch II |  |  |  | 21.5 | 21.5 | 21.5 |  |  |
| Masterbatch III |  |  |  |  |  |  | 21.5 |  |
| Total | 100 | 100 | 100 | 100 | 100 | 100 | 100 | 100 |

TABLE 3

|  | Example (Wt. %) | | | | | | | | |
| --- | --- | --- | --- | --- | --- | --- | --- | --- | --- |
|  | 3 | 4 | 5 | G | 6 | H | 7 | 8 | 9 |
|  | A | | | | | | | | |
| ExxonMobil 6605.70 HDPE (0.948 Density; 5 g/10 min MFI) | 50 | 45 | 73.5 |  | 50 | 100 | 50 | 50 | 50 |
| Marlex HHM 5202BN HDPE (0.951 Density; 0.35 g/10 min. MFI) |  | 28.5 |  |  | 32.6194 |  | 28.5 |  | 28.5 |
| Marlex HHM 5502BN HDPE (0.955 Density; 0.35 g/10 min. MFI) | 28.5 |  |  |  |  |  |  | 28.5 |  |
| Kuraray Septon 4033 SBC Flakes |  | 4.5 | 4.5 |  | 0.9675 |  |  |  |  |
| Sonneborn 550 Mineral Oil |  | 0.5 | 0.5 |  | 0.1075 |  |  |  |  |
| Chevron ALN 070 "No Break" Polypropylene Copolymer (0.9 Density; 7 MFI) |  |  |  | 100 |  |  |  |  |  |
| Hydrotalcite acid scavenger |  |  |  |  | 0.07525 |  |  |  |  |
| Chemtura Anox NDB antioxidant |  |  |  |  | 0.05268 |  |  |  |  |
|  | B | | | | | | | | |
| Chemtura Alkanox antioxidant |  |  |  |  | 0.05268 |  |  |  |  |
| Chemtura PolyBond 3009 maleated polyethylene (0.95 Density; 3-6 g/10 min. MFI) |  |  |  |  | 1.075 |  |  |  |  |
| Eclipse Fly Ash Blend B (Revolutionary Plastics, Las Vegas, NV) |  |  |  |  | 15.05 |  |  |  |  |
| Masterbatch III |  | 21.5 | 21.5 |  |  |  |  |  |  |
| Masterbatch IV | 21.5 |  |  |  |  |  | 21.5 |  |  |
| Masterbatch V |  |  |  |  |  |  |  | 21.5 | 21.5 |
| Total | 100 | 100 | 100 | 100 | 100 | 100 | 100 | 100 | 100 |

TABLE 4

|  | Example (Wt. %) | | | | | | | | | |
| --- | --- | --- | --- | --- | --- | --- | --- | --- | --- | --- |
|  | 10 | 11 | 12 | 13 | 14 | 15 | 16 | 17 | 18 | 19 |
| ExxonMobil 6605.70 HDPE (0.948 Density; 5 g/10 min MFI) | 50 | 50 | 50 | 50 | 50 | 50 | 50 | 50 | 50 | 50 |
| Marlex HHM 5202BN HDPE (0.951 Density; 0.35 g/10 min. MFI) |  | 28.5 | 28.5 |  |  |  |  | 14.25 |  | 14.25 |
| Marlex HHM 5502BN HDPE (0.955 Density; 0.35 g/10 min. MFI) | 28.5 |  |  |  |  |  | 14.25 |  | 14.25 |  |
| Westlake EN1807AA HDPE (0.921 Density; 0.7 g/10 min. MFI) |  |  |  | 28.5 | 28.5 | 28.5 | 14.25 | 14.25 | 14.25 | 14.25 |

TABLE 4-continued

| | Example (Wt. %) | | | | | | | | | |
|---|---|---|---|---|---|---|---|---|---|---|
| | 10 | 11 | 12 | 13 | 14 | 15 | 16 | 17 | 18 | 19 |
| Masterbatch IV | 21.5 | | | 21.5 | | | 21.5 | | | 21.5 |
| Masterbatch V | | | | | | 21.5 | | | 21.5 | |
| Masterbatch VI | | 21.5 | 21.5 | | 21.5 | | | 21.5 | | |
| Total | 100 | 100 | 100 | 100 | 100 | 100 | 100 | 100 | 100 | 100 |

TABLE 5

| | Example (Wt. %) | | | | | | | | | |
|---|---|---|---|---|---|---|---|---|---|---|
| | 20 | 21 | I | 22 | 23 | 24 | 25 | 26 | 27 | J |
| A | | | | | | | | | | |
| ExxonMobil 6605.70 HDPE (0.948 Density; 5 g/10 min MFI) | 50 | 50 | | | | | | | | |
| Dow DMDA-8007 NT 7 HDPE (0.965 Density; 8.3 g/10 min. MFI) | | | 100 | 50 | 50 | 50 | 50 | 50 | 50 | |
| Marlex 9708 HDPE (0.962 Density; 8 g/10 min. MFI) | | | | | | | | | | 100 |
| Marlex HHM 5202BN HDPE (0.951 Density; 0.35 g/10 min. MFI) | | 14.25 | | 28.5 | | 32.6194 | 28.5 | | | |
| Martex HHM 5502BN HDPE (0.955 Density; 0.35 g/10 min. MFI) | 14.25 | | | | | | | | 28.5 | |
| Westlake EN1807AA HDPE (0.921 Density; 0.7 g/10 min. MFI) | 14.25 | 14.25 | | | 28.5 | | | 28.5 | | |
| B | | | | | | | | | | |
| Kuraray Septon 4033 SBC Flakes | | | | | | 0.9675 | | | | |
| Sonneborn 550 Mineral Oil | | | | | | 0.1075 | | | | |
| Hydrotalcite acid scavenger | | | | | | 0.07525 | | | | |
| Chemtura Anox NDB antioxidant | | | | | | 0.05268 | | | | |
| Chemtura Alkanox antioxidant | | | | | | 0.05268 | | | | |
| Chemtura PolyBond 3009 maleated polyethylene (0.95 Density; 3-6 g/10 min. MFI) | | | | | | 1.075 | | | | |
| Eclipse Fly Ash Blend B (Revolutionary Plastics, Las Vegas, NV) | | | | | | 15.05 | | | | |
| Masterbatch IV | | | | 21.5 | 21.5 | | | | | |
| Masterbatch V | | 21.5 | | | | | | | 21.5 | |
| Masterbatch VI | 21.5 | | | | | | 21.5 | 21.5 | | |
| Total | 100 | 100 | 100 | 100 | 100 | 100 | 100 | 100 | 100 | 100 |

TABLE 6

| | Example (Wt. %) | | | | | | | | | |
|---|---|---|---|---|---|---|---|---|---|---|
| | 28 | 29 | K | 30 | 31 | 32 | 33 | 34 | 35 | 36 |
| A | | | | | | | | | | |
| Marlex 9708 HDPE (0.962 Density; 8 g/10 min. MFI) | 50 | 50 | 50 | 50 | 50 | 50 | 50 | 50 | 50 | 50 |
| Marlex HHM 5202BN HDPE (0.951 Density; 0.35 g/10 min. MFI) | 28.5 | | 32.6194 | 28.5 | | | 28.5 | | 14.25 | |

TABLE 6-continued

| | Example (Wt. %) | | | | | | | | | |
|---|---|---|---|---|---|---|---|---|---|---|
| | 28 | 29 | K | 30 | 31 | 32 | 33 | 34 | 35 | 36 |
| Marlex HHM 5502BN HDPE (0.955 Density; 0.35 g/10 min. MFI) | | | | | | 28.5 | | | | 14.25 |
| Westlake EN1807AA HDPE (0.921 Density; 0.7 g/10 min. MFI) | | 28.5 | | | 28.5 | | | 28.5 | 14.25 | 14.25 |
| Kuraray Septon 4033 SBC Flakes | | | 0.9675 | | | | | | | |
| Sonneborn 550 Mineral Oil | | | 0.1075 | | | | | | | |
| Hydrotalcite acid scavenger | | | 0.07525 | | | | | | | |
| Chemtura A nox NDB antioxidant | | | 0.05268 | | | | | | | |
| | | | B | | | | | | | |
| Chemtura Alkanox antioxidant | | | 0.05268 | | | | | | | |
| Chemtura PolyBond 3009 malcated polyethylene (0.95 Density; 3-6 g/10 min. MFI) | | | 1.075 | | | | | | | |
| Eclipse Fly Ash Blend B (Revolutionary Plastics, Las Vegas, NV) | | | 15.05 | | | | | | | |
| Masterbatch IV | 21.5 | 21.5 | | | | | | | | |
| Masterbatch V | | | | | | | 21.5 | 21.5 | 21.5 | 21.5 |
| Masterbatch VI | | | | 21.5 | 21.5 | | | | | |
| Total | 100 | 100 | 100 | 100 | 100 | 100 | 100 | 100 | 100 | 100 |

TABLE 7

| | Example (Wt. %) | | | | | | | | | |
|---|---|---|---|---|---|---|---|---|---|---|
| | 37 | 38 | 39 | 40 | 41 | 42 | L | 43 | 44 | 45 |
| ExxonMobil 6605.70 HDPE (0.948 Density; 5 g/10 min MFI) | | | | | | | 100 | 60.8 | 55.4 | 50 |
| Marlex 9708 HDPE (0.962 Density; 8 g/10 min. MFI) | 50 | 50 | 50 | 50 | 50 | 50 | | | | |
| Marlex HHM 5202BN HDPE (0.951 Density; 0.35 g/10 min. MFI) | 28.5 | | 14.25 | | 14.25 | | | | | |
| Marlex HHM 5502BN HDPE (0.955 Density; 0.35 g/10 min. MFI) | | 14.25 | | 28.5 | | 14.25 | | 28.5 | 28.5 | 28.5 |
| Westlake EN1807AA HDPE (0.921 Density; 0.7 g/10 min. MFI) | | 14.25 | 14.25 | | 14.25 | 14.25 | | | | |
| Masterbatch IV | | | | 21.5 | 21.5 | 21.5 | | | | |
| Masterbatch V | | | | | | | | 10.7 | 16.1 | 21.5 |
| Masterbatch VI | 21.5 | 21.5 | 21.5 | | | | | | | |
| Total | 100 | 100 | 100 | 100 | 100 | 100 | 100 | 100 | 100 | 100 |

TABLE 8

| | Example | | | | | | | | | |
|---|---|---|---|---|---|---|---|---|---|---|
| | 46 | 47 | 48 | 49 | 50 | 51 | 52 | 52A | 52B | 52C |
| ExxonMobil 6605.70 HDPE (0.948 Density; 5 g/10 min MFI) | 44.7 | 39.35 | 60.8 | 55.4 | 50 | 44.7 | 39.35 | 89.3 | 83.9 | 78.5 |
| Marlex HHM 5502BN HDPE (0.955 Density; 0.35 g/10 min. MFI) | 28.5 | 28.5 | 14.25 | 14.25 | 14.25 | 14.25 | 14.25 | | | |

TABLE 8-continued

| | Example | | | | | | | | | |
|---|---|---|---|---|---|---|---|---|---|---|
| | 46 | 47 | 48 | 49 | 50 | 51 | 52 | 52A | 52B | 52C |
| Westlake EN1807AA HDPE (0.921 Density; 0.7 g/10 min. MFI) | | | 14.25 | 14.25 | 14.25 | 14.25 | 14.25 | | | |
| Masterbatch V | 26.8 | 32.15 | 10.7 | 16.1 | 21.5 | 26.8 | 32.15 | 10.7 | 16.1 | 21.5 |
| Total | 100 | 100 | 100 | 100 | 100 | 100 | 100 | 100 | 100 | 100 |

TABLE 9

| | Example (Wt. %) | | | | | | | | | |
|---|---|---|---|---|---|---|---|---|---|---|
| | 52D | 52E | R | S | T | 53 | 54 | 55 | 56 | 57 |
| ExxonMobil 6605.70 HDPE (0.948 Density; 5 g/10 min MFI) | 73.2 | 67.85 | | | 100 | 36.75 | 32.75 | 28.75 | 24.5 | 20.5 |
| Marlex HHM 5202BN HDPE (0.951 Density; 0.35 g/10 min. MFI) | | | | 100 | | | | | | |
| Marlex HHM 5502BN HDPE (0.955 Density; 0.35 g/10 min. MFI) | | | 100 | | | 28.25 | 27.25 | 26.25 | 25.5 | 24.5 |
| Masterbatch V | 26.8 | 32.15 | | | | 35 | 40 | 45 | 50 | 55 |
| Total | 100 | 100 | 100 | 100 | 100 | 100 | 100 | 100 | 100 | 100 |

TABLE 10

| | Example (Wt. %) | | | | | | |
|---|---|---|---|---|---|---|---|
| | 58 | 59 | 60 | 61 | 62 | 63 | 64 |
| ExxonMobil 6605.70 HDPE (0.948 Density; 5 g/10 min MFI) | 16.5 | 36.75 | 32.75 | 28.75 | 24.5 | 20.5 | 16.5 |
| Marlex HHM 5502BN HDPE (0.955 Density; 0.35 g/10 min. MFI) | 23.5 | 14.125 | 13.625 | 13.125 | 12.75 | 12.25 | 11.75 |
| Westlake EN1807AA HDPE (0.921 Density; 0.7 g/10 min. MFI) | | 14.125 | 13.625 | 13.125 | 12.75 | 12.25 | 11.75 |
| Masterbatch V | 60 | 35 | 40 | 45 | 50 | 55 | 60 |
| Total | 100 | 100 | 100 | 100 | 100 | 100 | 100 |

As noted before, the compositions disclosed are composed of ingredients which can be varied to vary certain physical characteristics of the resulting product like product 46. Impact resistance is an important criteria for many compositions 44 and the resulting products 46. Samples A, B, C, and F were prepared by heating the ingredient or ingredients as noted in the Table 2 in a suitable blender operating at 232 degrees Centigrade (° C.). The blending or mixing effected by and in an injection molding machine has been found to be suitable. As noted hereinbefore, a blowing agent may also be inserted when the composition 47 is liquid but below the temperature to activate. Activation occurs shortly thereafter as the liquid composition 47 with blowing agent 16 is heated up in or for processing in a mechanical machine (e.g., an extruder) in the manufacturing process 48.

Table 11 presents test data for Samples A, B, C and F. The "neat" or "virgin" resin that is sample A has an impact resistance of 3.896. Sample G in Table 3 is a "no break" polypropylene copolymer which has impact resistance seen in Table 12 of 2.785. In turn we can see that given that increased hardness is desired for many products, the impact resistance needs to be greater than about 2.8 to exceed the performance of "no break" resin and greater than 3.9 in order to exceed the performance of "naked" or "virgin" HDPE resin.

Comparative Examples B and C had impact resistances well below 2.0 using Masterbatch I, with or without the addition of fractional melt resin, the impact resistance is about which 1.223 and 1.229 respectively which is less than the impact resistance of the neat resin that is sample A. The reduction in impact resistance is believed to be attributable to the absence of a suitable amount of what has been identified as a compatibilizer like compatibilizer 36. Comparative Examples 1A and 1B also were noted to have an impact resistance less than "neat" resin A and when using Masterbatch II, which contained a large amount of Polybond® compatibilizer but no oil-softened Septon® styrenic block copolymer. At the same time, it can be seen that sample 1B had an impact resistance of 2.735 which is comparable to the impact resistance of 2.785 of the "no break" copolymer that is sample G. Thus sample 1B can be seen to be a desired composition because it uses a fractional melt which can be "regrind" (recycled or reground material reconfigured to be useful as a resin), plus Masterbatch II that contains fly ash. In turn, the amount of base resin like Exxon Mobil 6605, used for a composition like composition 44 is reduced leading to potential savings because less base resin (replaced by fly ash filler 10) is used while the impact resistance is essentially the same and the flexural modulus is enhanced substantially more than 50%.

Turning now to sample or Example 1, we see from Table 2 that it includes 45% of a "neat" or base resin plus 28.5 percent of a fractional melt. Example 1 also has 5% of a blend of mineral oil and Septon® material plus 21.5% for Masterbatch II. From Table 11 we see that sample or example 1 has an impact resistance of 10.08 which is over 2.5 times better than "neat" resin like sample A. At the same time, the flexural modulus increased from 45,246 to 61,623. In turn, the product 46 resulting from the sample 1 is tougher and more flexible. Compared to a "naked" resin line sample A, sample 1 used only half a base resin 42 while using a notable amount of fractional melt 60 and Masterbatch II that contains fly ash blend as filler 10. Thus sample or Example 1 demonstrates that a composition can be prepared that leads to product with enhanced physical properties like enhanced impact resistance and flexural modulus while reducing the amount of "neat" resin and allowing one to use fractional melt or low melt index materials and a fly ash blend filler 10 to reduce the cost of the composition 44 and the resulting product 46.

Samples or Examples 2, 4, and 5 used Masterbatch III which varied the types of compatibilizer added to composition 44 while adding to the mixture, the blend 23 of oil-softened Septon SBC into the Masterbatches III and IV via line 21 along with different types and amounts of fractional melt 60. Example 2 showed an notable increase in impact resistance with Examples 4 and 5 showing significant increase in the impact resistance. Although Example 5 showed that fractional melt resin could be excluded from the mix 26, it was added to the masterbatch mixtures. The preference is for that fractional melt resin 60 to be present in the composition 44 because the tensile strength is reduced by approximately one third while the impact resistance is more than tripled.

As mentioned above, Examples 6 and 7 explored the use of Masterbatch IV. Although Example 6 was roughly comparable in performance to "no break" polypropylene copolymer resin (Comparative Example G) and therefore acceptable overall, it was generally inferior to neat ExxonMobil HDPE resin (Comparative Example H). Example 7 showed increased impact strength over Comparative Example H, which indicates a preference for use of Masterbatch IV to fully mix the Polybond compatibilizer, the blend 23 of oil-softened Septon SBC, and the trio of stabilizer ingredients into fractional melt resin as the carrier. Masterbatch IV used less of expensive Polybond compatibilizer and oil-softened Septon SBC in favor of inexpensive fractional melt resin.

Unexpectedly, reduced amounts of Polybond compatibilizer and the blend 23 of oil-softened SBC did not detract from the overall physical performance of the composition 44. Examples 7-21 demonstrate a progression of increasing impact resistance properties based upon use of Masterbatches IV, V, and VI. Masterbatches IV-VI differ only in the type of fractional melt resin used. Examples 7-21 demonstrate obtain different and preferably desired impact resistance ranging from 4 to 11 while maintaining comparable tensile strength and flexural strength to neat resin of HDPE or "no break" polypropylene copolymer.

For those industries which rely upon "no break" polypropylene copolymer, the significance of the ability to use a polyethylene compound cannot be overstated. Polyethylene allows one to have faster processing speeds; so there is a production cost savings. In view of the compositions herein set forth, one is able to control certain physical characteristics of the end product 46 and indeed in many cases obtain enhanced or improved physical characteristics like impact resistance.

Comparative Example "I" ("eye") seen in Table 5 shows use of Dow DMDA-8007 High Density Polyethylene ("HDPE") as an alternate base resin. Examples 22-27 show data for different combinations including combinations that use Masterbatches IV, V, and VI. The performance characteristics are seen in Tables 14 and 15. Some differences in performance between Examples 22-27 as well as preceding Examples 7-21 are believed to be attributable to different melt flow indexes. Even though some of the physical characteristics of the resulting product 46 were reduced, they demonstrate the ability to control the physical characteristics and demonstrate acceptable physical characteristics.

With the exception of Comparative Example K, previously discussed, the Examples 28-64 are compositions that are compared with several Comparative Examples J, L, R, S and T in Tables 6-10. These samples demonstrate the ability to control the HDPE base resin 42, while producing acceptable formulations as evident from the data in Tables 15-21.

TABLE 11

| | Example | | | | | | | |
|---|---|---|---|---|---|---|---|---|
| | A | B | C | 1 | 1B | 1C | 2 | F |
| | A | | | | | | | |
| Specific Gravity ASTM D792 | 0.943 | 1.041 | 1.018 | 1.04 | 1.043 | 1.047 | 1.046 | 0.941 |
| Shore D Hardness (ASTM D2240) | 61 | 62 | 62 | 59 | 61 | 62 | 61 | 60 |
| Moisture Test using the Sartorius Moisture Analyzer (%) | | 0.053 | 0.066 | | | | | |
| Ash Test (ASTM D 5630-06) (%) | | 15.442 | 11.250 | 14.680 | 15.076 | 15.140 | 15.122 | |
| ASTM D256 Impact Resistance (ft-lbf/in) | 3.896 | 1.223 | 1.239 | 10.08 | 1.503 | 2.735 | 6.354 | 3.974 |

TABLE 11-continued

| | Example | | | | | | | |
|---|---|---|---|---|---|---|---|---|
| | A | B | C | 1 | 1B | 1C | 2 | F |
| ASTM D256 Impact Strength (ft-lbf/in2) | 9.739 | 3.058 | 3.097 | 25.2 | 3.758 | 6.838 | 15.885 | 9.936 |
| ASTM D638 Type 4 Rigid Tensile Strength Stress Yield (psi) 3 in/min. | 2,811 | 2,561 | 2,538 | 2,749 | 3,019 | 3,136 | 2,981 | 2,853 |
| B | | | | | | | | |
| ASTM D638 Type 4 Rigid Tensile Modulus Youngs Modulus (psi) 3 in/min | 109,608 | 128,758 | 123,987 | 121,923 | 150,423 | 164,499 | 150,180 | 113,906 |
| ASTM D790 Flexural Strength Bending Strength @ Peak (lbf/in2) | 1,078 | 1,230 | 1,485 | 1,208 | 1,303 | 1,452 | 1,231 | 1,021 |
| ASTM D790 Flexural Modulus Bending Modulus (lbf/in2) | 45,246 | 61,559 | 55,467 | 61,623 | 71,738 | 75,730 | 56,463 | |

TABLE 12

| | Example | | | | | | | |
|---|---|---|---|---|---|---|---|---|
| | 3 | 4 | 5 | G | 6 | H | 7 | 8 |
| A | | | | | | | | |
| Specific Gravity ASTM D792 | 1.046 | 1.041 | 1.041 | 0.9 | 1.042 | 0.941 | 1.038 | 1.057 |
| Shore D Hardness (ASTM D2240) | 60 | 57 | 58 | 67 | 63.00 | 61.00 | 63.50 | 65.00 |
| Moisture Test using the Sartorius Moisture Analyzer (%) | 0.07 | 0.05 | 0.04 | | 0.00111 | | 0.00051 | 0.00057 |
| Ash Test (ASTM D5630-06) (%) | 15.4 | 14.46 | 14.44 | | 0.1469 | | 0.1369 | 0.1649 |
| ASTM D256 Impact Resistance (ft-lbf/in) | 4.134 | 10.42 | 10.194 | 2.785 | 3.1 | 3.8 | 4.4 | 5.5 |
| ASTM D256 Impact Strength (ft-lbf/in2) | 10.334 | 26.05 | 25.485 | 6.961 | 7.7 | 9.5 | 11.0 | 13.7 |
| ASTM D638 Type 4 Rigid Tensile Strength Stress Yield (psi) 3 in/min. | 3,170 | 2,668 | 2,538 | 3,115 | 3,043 | 2,747 | 3,341 | 3,410 |
| B | | | | | | | | |
| ASTM D638 Type 4 Rigid Tensile Modulus Youngs Modulus (psi) 3in/min | 161,003 | 113,403 | 107,044 | 169,996 | 153,696 | 109,262 | 166,017 | 171,920 |
| ASTM D790 Flexural Strength Bending Strength @ Peak (lbf/in2) | 1,492 | 1,185 | 1,073 | 1,878 | 1,460 | 1,065 | 1,474 | 1,508 |
| ASTM D790 Flexural Modulus Bending Modulus (lbf/in2) | | | | | 73,116 | 56,812 | 83,929 | 90,296 |
| Specific Gravity ASTM D792 | 1.046 | 1.041 | 1.041 | 0.9 | 1.042 | 0.941 | 1.038 | 1.057 |
| Shore D Hardness (ASTM D2240) | 60 | 57 | 58 | 67 | 63.00 | 61.00 | 63.50 | 65.00 |
| Moisture Test using the Sartorius Moisture Analyzer (%) | 0.07 | 0.05 | 0.04 | | 0.00111 | | 0.00051 | 0.00057 |
| Ash Test (ASTM D 5630-06) (%) | 15.4 | 14.46 | 14.44 | | 0.1469 | | 0.1369 | 0.1649 |
| C | | | | | | | | |
| ASTM D256 Impact Resistance (ft-lbf/in) | 4.134 | 10.42 | 10.194 | 2.785 | 3.1 | 3.8 | 4.4 | 5.5 |

TABLE 12-continued

| | Example | | | | | | | |
|---|---|---|---|---|---|---|---|---|
| | 3 | 4 | 5 | G | 6 | H | 7 | 8 |
| ASTM D256 Impact Strength (ft-lbf/in2) | 10.334 | 26.05 | 25.485 | 6.961 | 7.7 | 9.5 | 11.0 | 13.7 |
| ASTM D638 Type 4 Rigid Tensile Strength Stress Yield (psi) 3 in/min. | 3,170 | 2,668 | 2,538 | 3,115 | 3,043 | 2,747 | 3,341 | 3,410 |
| ASTM D638 Type 4 Rigid Tensile Modulus Youngs Modulus (psi) 3 in/min | 161,003 | 113,403 | 107,044 | 169,996 | 153,696 | 109,262 | 166,017 | 171,920 |
| ASTM D790 Flexural Strength Bending Strength @ Peak (lbf/in2) | 1,492 | 1,185 | 1,073 | 1,878 | 1,460 | 1,065 | 1,474 | 1,508 |
| ASTM D790 Flexural Modulus Bending Modulus (lbf/in2) | | | | | 73,116 | 56,812 | 83,929 | 90,296 |

TABLE 13

| | Example | | | | | | | |
|---|---|---|---|---|---|---|---|---|
| | 9 | 10 | 11 | 12 | 13 | 14 | 15 | 16 |
| | A | | | | | | | |
| Specific Gravity ASTM D792 | 1.044 | 1.045 | 1.043 | 1.046 | 1.033 | 1.039 | 1.04 | 1.04 |
| Shore D Hardness (ASTM D2240) | 65.00 | 65.50 | 63.50 | 64.50 | 60.50 | 60.50 | 62.00 | 64.00 |
| Moisture Test using the Sartorius Moisture Analyzer (%) | 0.00064 | 0.0006 | 0.00057 | 0.00058 | 0.00085 | 0.00071 | 0.00072 | |
| Ash Test (ASTM D 5630-06) (%) | 0.1476 | 0.14832 | 0.1511 | 0.1511 | 0.1474 | 0.1488 | 0.1516 | 0.15006 |
| ASTM D256 Impact Resistance (ft-lbf/in) | 6.6 | 6.7 | 7.6 | 8.5 | 10.0 | 10.4 | 11.1 | 11.1 |
| ASTM D256 Impact Strength (ft-lbf/in2) | 16.5 | 16.9 | 19.0 | 21.4 | 24.9 | 26.0 | 27.8 | 27.8 |
| ASTM D638 Type 4 Rigid Tensile Strength Stress Yield (psi) 3 in/min. | 3,285 | 3,317 | 3,054 | 3,132 | 2,492 | 2,454 | 2,316 | 2,763 |
| | B | | | | | | | |
| ASTM D638 Type 4 Rigid Tensile Modulus Youngs Modulus (psi) 3 in/min | 145,768 | 151,451 | 151,654 | 146,727 | 110,801 | 105,660 | 100,193 | 104,278 |
| ASTM D790 Flexural Strength Bending Strength @ Peak (lbf/in2) | 1,436 | 1,492 | 1,432 | 1,504 | 987 | 948 | 1,053 | 1,298 |

TABLE 13-continued

| | Example | | | | | | | |
|---|---|---|---|---|---|---|---|---|
| | 9 | 10 | 11 | 12 | 13 | 14 | 15 | 16 |
| ASTM D790 Flexural Modulus Bending Modulus (lbf/in2) | 75,780 | 80,856 | 75,903 | 83,487 | 49,808 | 45,075 | 58,547 | 73,307 |

TABLE 14

| | Example | | | | | | | |
|---|---|---|---|---|---|---|---|---|
| | 17 | 18 | 19 | 20 | 21 | I | 22 | 23 |
| A | | | | | | | | |
| Specific Gravity ASTM D792 | 1.041 | 1.043 | 1.043 | 1.04 | 1.041 | 0.952 | 1.053 | 1.045 |
| Shore D Hardness (ASTM D2240) | 63.50 | 63.50 | 63.50 | 63.50 | 63.0 | 66.0 | 66.5 | 63.0 |
| Moisture Test using the Sartorius Moisture Analyzer (%) | 0.00053 | 0.00054 | | 0.00053 | .059 | | 0.052 | 0.073 |
| Ash Test (ASTM D 5630-06) (%) | 0.15033 | 0.14896 | 0.15248 | 0.15049 | | | 15.10 | 15.41 |
| ASTM D256 Impact Resistance (ft-lbf/in) | 11.1 | 11.2 | 11.3 | 11.5 | 11.339 | 1.802 | 3.661 | 4.638 |
| ASTM D256 Impact Strength (ft-lbf/in2) | 27.8 | 28.0 | 28.3 | 28.7 | 28.348 | 4.505 | 9.153 | 11.596 |
| ASTM D638 Type 4 Rigid Tensile Strength Stress Yield (psi) 3 in/min. | 2,678 | 2,811 | 2,740 | 2,630 | 2,799 | 3,690 | 3,700 | 2,747 |
| B | | | | | | | | |
| ASTM D638 Type 4 Rigid Tensile Modulus Youngs Modulus (psi) 3 in/min | 122,069 | 125,751 | 114,216 | 118,269 | 128,758 | 185,426 | 197,707 | 131,392 |
| ASTM D790 Flexural Strength Bending Strength @ Peak (lbf/in2) | 1,178 | 1,297 | 1,307 | 1,256 | 1,547 | 1,335 | 1,764 | 1.247 |
| ASTM D790 Flexural Modulus Bending Modulus (lbf/in2) | 64,580 | 71,370 | 73,375 | 69,906 | 93,949 | 68,521 | 96,255 | 66,698 |

TABLE 15

| | Example | | | | | | | |
|---|---|---|---|---|---|---|---|---|
| | 24 | 25 | 26 | 27 | J | 28 | 29 | K |
| A | | | | | | | | |
| Specific Gravity ASTM D792 | 1.051 | 1.048 | 1.041 | 1.052 | 0.951 | 1.048 | 1.041 | 1.047 |
| Shore D Hardness (ASTM D2240) | 66.0 | 66.0 | 63.0 | 67.0 | 65.5 | 66.5 | 63.0 | 66.0 |
| Moisture Test using the Sartorius Moisture Analyzer (%) | 0.026 | 0.063 | 0.057 | 0.056 | | 0.081 | 0.109 | 0.069 |
| Ash Test (ASTM D 5630-06) (%) | 14.99 | 14.9 | 14.98 | 14.93 | | 14.99 | 15.24 | 15.35 |
| ASTM D256 Impact Resistance (ft-lbf/in) | 3.275 | 6.013 | 8.619 | 4.719 | 1.574 | 2.941 | 4.143 | 1.470 |
| ASTM D256 Impact Strength (ft-lbf/in2) | 8.188 | 15.034 | 21.547 | 11.799 | 3.934 | 7.354 | 10.357 | 3.675 |

TABLE 15-continued

|  | Example | | | | | | | |
|---|---|---|---|---|---|---|---|---|
|  | 24 | 25 | 26 | 27 | J | 28 | 29 | K |
| ASTM D638 Type 4 Rigid Tensile Strength Stress Yield (psi) 3 in/min. | 3,603 | 3,555 | 2,785 | 3,825 | 3,422 | 3,638 | 2,681 | 3,435 |
| B | | | | | | | | |
| ASTM D638 Type 4 Rigid Tensile Modulus Youngs Modulus (psi) 3 in/min | 186,997 | 170,833 | 126,141 | 195,469 | 145,813 | 184,519 | 120,988 | 184,971 |
| ASTM D790 Flexural Strength Bending Strength @ Peak (lbf/in2) | 1,770 | 1,619 | 1,184 | 1,748 | 1,234 | 1,574 | 1,182 | 1,582 |
| ASTM D790 Flexural Modulus Bending Modulus (lbf/in2) | 91,034 | 91,490 | 64,685 | 100,975 | 70,815 | 78,980 | 63,829 | 78,820 |

TABLE 16

|  | Example | | | | | | | |
|---|---|---|---|---|---|---|---|---|
|  | 30 | 31 | 32 | 33 | 34 | 35 | 36 | 37 |
| A | | | | | | | | |
| Specific Gravity ASTM D792 | 1.051 | 1.042 | 1.049 | 1.046 | 1.038 | 1.046 | 1.045 | 1.04 |
| Shore D Hardness (ASTM D2240) | 66.5 | 62.5 | 67.0 | 65.0 | 65.0 | 65.0 | 65.0 | 66.5 |
| Moisture Test using the Sartorius Moisture Analyzer (%) | 0.045 | 0.085 | 0.06 | 0.085 | 0.059 | 0.079 | 0.075 | 0.069 |
| Ash Test (ASTM D 5630-06) (%) | 15.13 | 14.93 | 14.01 | 14.49 | 14.49 | 15.08 | 14.38 | 13.29 |
| ASTM D256 Impact Resistance (ft-lbf/in) | 4.017 | 7.083 | 3.020 | 3.277 | 7.033 | 5.000 | 4.842 | 4.026 |
| ASTM D256 Impact Strength (ft-lbf/in2) | 10.042 | 17.708 | 7.549 | 8.192 | 17.582 | 12.500 | 12.105 | 10.065 |
| ASTM D638 Type 4 Rigid Tensile Strength Stress Yield (psi) 3 in/min. | 3,213 | 2,560 | 3,485 | 3,577 | 2,679 | 3,036 | 3,121 | 3,467 |
| B | | | | | | | | |
| ASTM D638 Type 4 Rigid Tensile Modulus Youngs Modulus (psi) 3 in/min | 166,360 | 112,958 | 180,705 | 175,340 | 121,650 | 143,340 | 153,177 | 160,210 |
| ASTM D790 Flexural Strength Bending Strength @ Peak (lbf/in2) | 1,402 | 1,117 | 1,670 | 1,636 | 1,126 | 1,404 | 1,400 | 1,542 |
| ASTM D790 Flexural Modulus Bending Modulus (lbf/in2) | 73,684 | 59,693 | 90,569 | 89,352 | 61,172 | 79,305 | 80,941 | 87,366 |

TABLE 17

|  | Example | | | | | | | |
|---|---|---|---|---|---|---|---|---|
|  | 38 | 39 | 40 | 41 | 42 | L | 43 | 44 |
| A | | | | | | | | |
| Specific Gravity ASTM D792 | 1.044 | 1.043 | 1.053 | 1.043 | 1.049 | 0.941 | 0.993 | 1.018 |
| Shore D Hardness (ASTM D2240) | 65.0 | 64.5 | 67.0 | 65.0 | 65.0 | 61.0 | 61.0 | 62.0 |

TABLE 17-continued

|  | Example | | | | | | | |
|---|---|---|---|---|---|---|---|---|
|  | 38 | 39 | 40 | 41 | 42 | L | 43 | 44 |
| Moisture Test using the Sartorius Moisture Analyzer (%) | 0.095 | 0.084 | 0.065 | 0.124 | 0.066 |  | 0.071 | 0.052 |
| Ash Test (ASTM D 5630-06) (%) | 14.95 | 14.8 | 15.52 | 15.47 | 15.21 |  | 7.602 | 11.128 |
| ASTM D256 Impact Resistance (ft-lbf/in) | 5.355 | 5.544 | 3.515 | 5.032 | 5.138 | 4.089 | 5.352 | 5.394 |
| ASTM D256 Impact Strength (ft-lbf/in2) | 13.389 | 13.859 | 8.787 | 12.580 | 12.844 | 10.222 | 13.271 | 13.485 |
| ASTM D638 Type 4 Rigid Tensile Strength Stress Yield (psi) 3 in/min. | 3,008 | 2,920 | 3,504 | 3,060 | 3,007 | 2,645 | 3,153 | 3,173 |
|  | B | | | | | | | |
| ASTM D638 Type 4 Rigid Tensile Modulus Youngs Modulus (psi) 3 in/min | 138,141 | 130,066 | 173,560 | 144,469 | 142,682 | 99,019 | 143,529 | 156,459 |
| ASTM D790 Flexural Strength Bending Strength @ Peak (lbf/in2) | 1,340 | 1,040 | 1,728 | 1,393 | 1,395 | 1,690 | 1,825 | 1,878 |
| ASTM D790 Flexural Modulus Bending Modulus (lbf/in2) | 75,812 | 63,103 | 96,380 | 79,018 | 78,936 | 104,171 | 115,608 | 117,979 |
| ASTM ASTM D 3418-08 Thermal Capacity (J/g) |  |  |  |  |  | 161.0 | 156.6 | 149.2 |

TABLE 18

|  | Example | | | | | | | |
|---|---|---|---|---|---|---|---|---|
|  | 45 | 46 | 47 | 48 | 49 | 50 | 51 | 52 |
|  | A | | | | | | | |
| Specific Gravity ASTM D792 | 1.048 | 1.075 | 1.107 | 0.986 | 1.014 | 1.041 | 1.069 | 1.102 |
| Shore D Hardness (ASTM D2240) | 61.0 | 62.0 | 62.0 | 60.0 | 60.0 | 60.0 | 61.0 | 61.0 |
| Moisture Test using the Sartorius Moisture Analyzer (%) | 0.073 | 0.043 | 0.041 | 0.04 | 0.072 | 0.058 | 0.042 | 0.066 |
| Ash Test (ASTM D 5630-06) (%) | 15.07 | 18.662 | 22.466 | 7.313 | 11.038 | 14.931 | 18.693 | 22.28 |
| ASTM D256 Impact Resistance (ft-lbf/in) | 5.376 | 5.696 | 6.019 | 9.020 | 9.337 | 10.071 | 11.540 | 11.857 |
| ASTM D256 Impact Strength (ft-lbf/in2) | 13.440 | 14.239 | 15.047 | 22.549 | 23.341 | 25.177 | 28.850 | 29.642 |
| ASTM D638 Type 4 Rigid Tensile Strength Stress Yield | 3,261 | 3,251 | 3,158 | 2,676 | 2,790 | 2,838 | 2,781 | 2,792 |
|  | B | | | | | | | |
| ASTM D638 Type 4 Rigid Tensile Modulus Youngs Modulus (psi) 3 in/min | 166,738 | 171,372 | 171,462 | 117,701 | 126,236 | 138,884 | 139,836 | 146,688 |
| ASTM D790 Flexural Strength Bending Strength @ Peak (lbf/in2) | 1,908 | 1,913 | 2,024 | 1,541 | 1,522 | 1,539 | 1,570 | 1,683 |
| ASTM D790 Flexural Modulus Bending Modulus (lbf/in2) | 123,467 | 123,061 | 127,889 | 94,911 | 94,151 | 95,090 | 95,975 | 103,072 |

TABLE 18-continued

|  | Example | | | | | | | |
|---|---|---|---|---|---|---|---|---|
|  | 45 | 46 | 47 | 48 | 49 | 50 | 51 | 52 |
| ASTM D 3418-08 Thermal Capacity (J/g) | 145.6 | 139.1 | 111.4 | 128.9 | 132.0 | 118.1 | 113.9 | 111.4 |

TABLE 19

|  | Example | | | | | | | |
|---|---|---|---|---|---|---|---|---|
|  | 52A | 52B | 52C | 52D | 52E | R | S | T |
| A | | | | | | | | |
| Specific Gravity ASTM D792 | 0.993 | 1.015 | 1.043 | 1.071 | 1.103 | 0.948 | 0.945 | 0.943 |
| Shore D Hardness (ASTM D2240) | 62.0 | 62.0 | 62.0 | 62.0 | 52.0 | 59.0 | 60.0 | 63.0 |
| Moisture Test using the Sartorius Moisture Analyzer (%) | 0.072 | 0.059 | 0.052 | 0.06 | 0.063 | | | |
| Ash Test (ASTM 5630-06) (%) | 7.01 | 10.9 | 15.08 | 18.59 | 22.11 | | | |
| ASTM D256 Impact Resistance (ft-lbf/in) | 2.501 | 2.317 | 2.354 | 2.343 | 2.511 | 13.257 | 12.496 | 4.061 |
| ASTM D256 Impact Strength (ft-lbf/in2) | 6.251 | 5.792 | 5.880 | 5.859 | 6.277 | 33.141 | 31.241 | 10.152 |
| ASTM D638 Type 4 Rigid Tensile Strength Stress Yield | 2,805 | 2,831 | 2,962 | 2,949 | 3,011 | 3,705 | 3,397 | 2,728 |
| B | | | | | | | | |
| ASTM D638 Type 4 Rigid Tensile Modulus Youngs Modulus (psi) 3 in/min | 124,324 | 135,403 | 145,902 | 154,735 | 155,485 | 168,878 | 147,277 | 102,559 |
| ASTM D790 Flexural Strength Bending Strength @ Peak (lbf/in2) | 1,709 | 1,735 | 1,822 | 1,938 | 1,917 | 2,003 | 1,883 | 1,600 |
| ASTM D790 Flexural Modulus Bending Modulus (lbf/in2) | 106,118 | 107,901 | 114,928 | 123,498 | 122,901 | 125,487 | 112,637 | 98,233 |
| ASTM ASTM D 3418-08 Thermal Capacity (J/g) | 153.9 | 141.8 | 137.9 | 135.9 | 126.7 | 187.1 | 171.9 | 158.8 |

TABLE 20

|  | Example | | | | | | | |
|---|---|---|---|---|---|---|---|---|
|  | 53 | 54 | 55 | 56 | 57 | 58 | 59 | 60 |
| A | | | | | | | | |
| Specific Gravity ASTM D792 | 1.122 | 1.151 | 1.186 | 1.220 | 1.259 | 1.302 | 1.117 | 1.144 |
| Shore D Hardness (ASTM D2240) | 66.0 | 67.0 | 67.0 | 67.5 | 68.0 | 68.5 | 64.5 | 65.0 |
| Moisture Test using the Sartorius Moisture Analyzer (%) | 0.058 | 0.041 | 0.065 | 0.172 | 0.064 | 0.038 | 0.055 | 0.076 |
| Ash Test (ASTM 5630-06) (%) | 24.42 | 27.83 | 31.44 | 34.9 | 38.56 | 41.98 | 24.18 | 27.68 |
| ASTM D256 Impact Resistance (ft-lbf/in) | 7.386 | 6.223 | 5.127 | 4.264 | 3.774 | 3.562 | 12.036 | 12.283 |
| ASTM D256 Impact Strength (ft-lbf/in2) | 18.465 | 15.559 | 12.817 | 10.660 | 9.436 | 8.906 | 30.091 | 30.707 |

TABLE 20-continued

| | Example | | | | | | | |
|---|---|---|---|---|---|---|---|---|
| | 53 | 54 | 55 | 56 | 57 | 58 | 59 | 60 |
| ASTM D638 Type 4 Rigid Tensile Strength Stress Yield (psi) 3 in/min. | 3,433 | 3,366 | 3,400 | 3,445 | 3,316 | 3,311 | 2,827 | 2,854 |
| | | | | B | | | | |
| ASTM D638 Type 4 Rigid Tensile Modulus Youngs Modulus (psi) 3 in/min | 185,079 | 188,037 | 196,158 | 210,682 | 205,858 | 201,092 | 143,009 | 152,751 |
| ASTM D790 Flexural Strength Bending Strength @ Peak (lbf/in2) | 2,054 | 2,067 | 2,157 | 2,199 | 2,243 | 2,272 | 1,663 | 1,664 |
| ASTM D790 Flexural Modulus Bending Modulus (lbf/in2) | 130,494 | 135,567 | 145,871 | 146,959 | 151,544 | 150,756 | 103,797 | 104,314 |
| ASTM ASTM D 3418-08 Thermal Capacity (J/g) | 124.7 | 118.0 | 112.5 | 108.7 | 103.5 | 94.6 | 102.8 | 94.9 |

TABLE 21A

| Example | 61 | 62 | 63 | 64 |
|---|---|---|---|---|
| Specific Gravity ASTM D792 | 1.175 | 1.214 | 1.254 | 1.295 |
| Shore D Hardness (ASTM D2240) | 65.0 | 65.5 | 65.5 | 66.0 |
| Moisture Test using the Sartorius Moisture Analyzer (%) | 0.051 | 0.066 | 0.067 | 0.0972 |
| Ash Test (ASTM D 5630-06) (%) | 31.27 | 34.73 | 38.22 | 41.81 |
| ASTM D256 Impact Resistance (ft-lbf/in) | 11.519 | 9.304 | 8.387 | 7.154 |
| ASTM D256 Impact Strength (ft-lbf/in2) | 28.797 | 23.260 | 20.967 | 17.884 |
| ASTM D638 Type 4 Rigid Tensile Strength Stress Yield (psi) 3 in/min. | 2,920 | 2,932 | 2,822 | 2,853 |
| ASTM D638 Type 4 Rigid Tensile Modulus Youngs Modulus (psi) 3 in/min | 162,134 | 163,870 | 165,724 | 177,469 |
| ASTM D790 Flexural Strength Bending Strength @ Peak (lbf/in2) | 1,678 | 1,768 | 1,845 | 1,944 |
| ASTM D790 Flexural Modulus Bending Modulus (lbf/in2) | 106,549 | 113,671 | 119,251 | 128,335 |
| ASTM ASTM D 3418-08 Thermal Capacity (J/g) | 90.8 | 87.2 | 80.5 | 74.0 |

Samples or Examples 52 A through 52E demonstrate the ability to create compositions that use fractional melt resin with Masterbatch V in amounts ranging from about 10% to about 33%. Impact resistance remained relatively constant at amounts less than 3, greater than Comparative Examples B and C and samples 1A and 1 B, which used different masterbatches than preferred Masterbatch V, but much less than Examples 43-47 which used the fractional melt resin along with Masterbatch V in the same range of amounts.

Comparative Examples R, S, and T demonstrate the physical properties of the preferred fractional melt resins in neat form and the preferred thermoplastic matrix resin also in neat form, respectively. The impact resistances of the two fractional melt resins were greater than any composite achieved but lacked the other physical properties to be useful because they are not suitable for use in an injection molding process. Comparative Example T can be compared to Comparative Examples A, F, H, and L, all 100% Exxon-Mobil 6605.70 HDPE. The impact resistances are very close in measurement among them, providing a basis of comparison for the various sets of experiments comprising the Examples.

Examples 53-58 show the use of increasing amounts of the preferred Masterbatch V with slightly decreasing amounts of preferred fractional melt resin and significantly decreasing amounts of ExxonMobil 6605.70 HDPE. The impact resistances decreased as Masterbatch V content increased, but all remained above the level of 2.8.

Examples 59-64 illustrate that result when the fractional melt resin is evenly split between Marlex HHM 5502BN HDPE and Westlake EN1807AA HDPE fractional melt resins. Each of Examples 59-64 can be compared with Examples 53-58 to determine that the blend of the two different fractional melt resins can increase the impact resistances of the compositions, all other factors constant.

Examples 59-61 all had impact resistances within 86% of the impact resistance of Marlex HHM 5502BN HDPE alone (Comparative Example R) with Masterbatch V content of 35, 40, and 45 weight percent respectively, all other factors constant. Unexpectedly, the impact resistance of Example 60 (40 weight percent of Masterbatch V) was greater than the impact resistances of Examples 59 and 61, indicating a preference for Example 60, all other factors constant.

It should be noted that in many of the compositions herein discussed, fractional melt materials were used. Fractional melt material has a melt flow index of less than one. However, it should be understood that low melt index materials may also be used in lieu of or with the fractional melt material. Low melt index materials have a melt flow index of about less than three.

Figure 2:
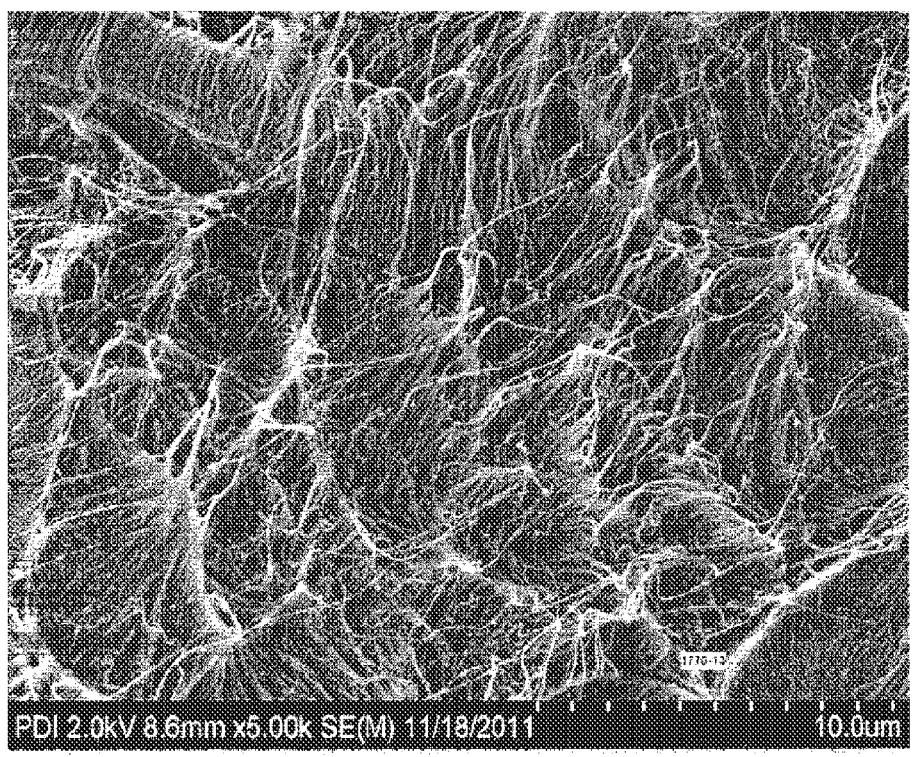
FIG. 2 is a photomicrograph at 5000 magnification of a Comparative Example.
Figure 3:
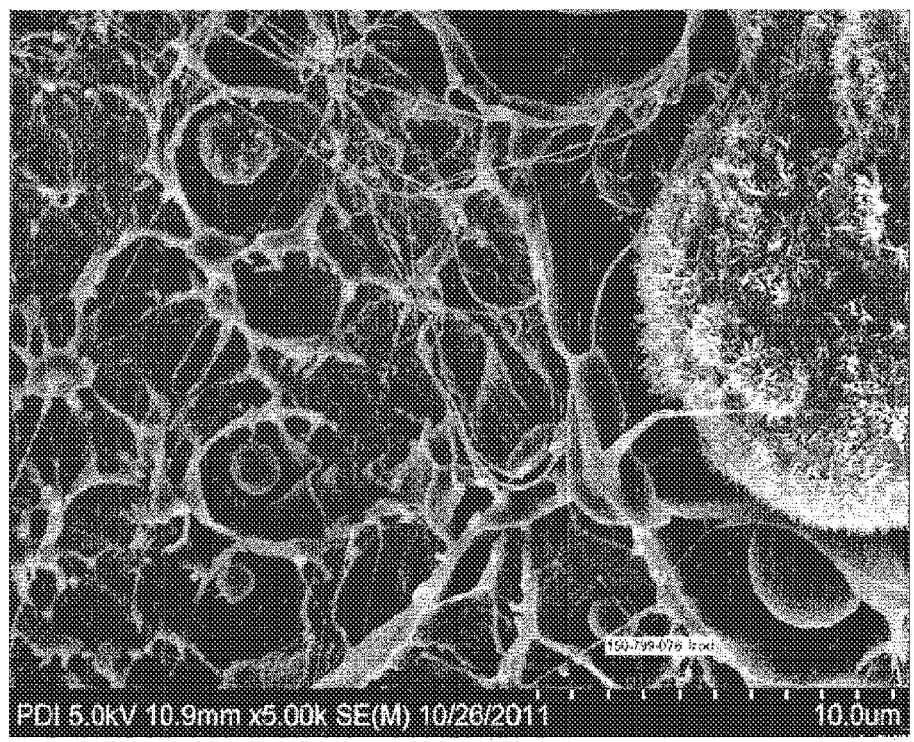
FIG. 3 is a photomicrograph at 5000 magnification of another Comparative Example.

Turning now to FIGS. 2-8, they are all photomicrographs at 5000 magnification of Comparative Examples A, B 7, 6, 8, 21, and 20, respectively. FIG. 2 is a photo of Example A which is ExxonMobil 6605.70 HDPE. It provides a visual image of the thermoplastic base resin against which other samples may be compared. FIG. 3 shows Composition B which is a combination of Masterbatch I and the ExxonMobil 6605.70 HDPE. In FIG. 2, the fly ash particles are resident in but dissociated from sockets of thermoplastic base resin.

Figure 4:
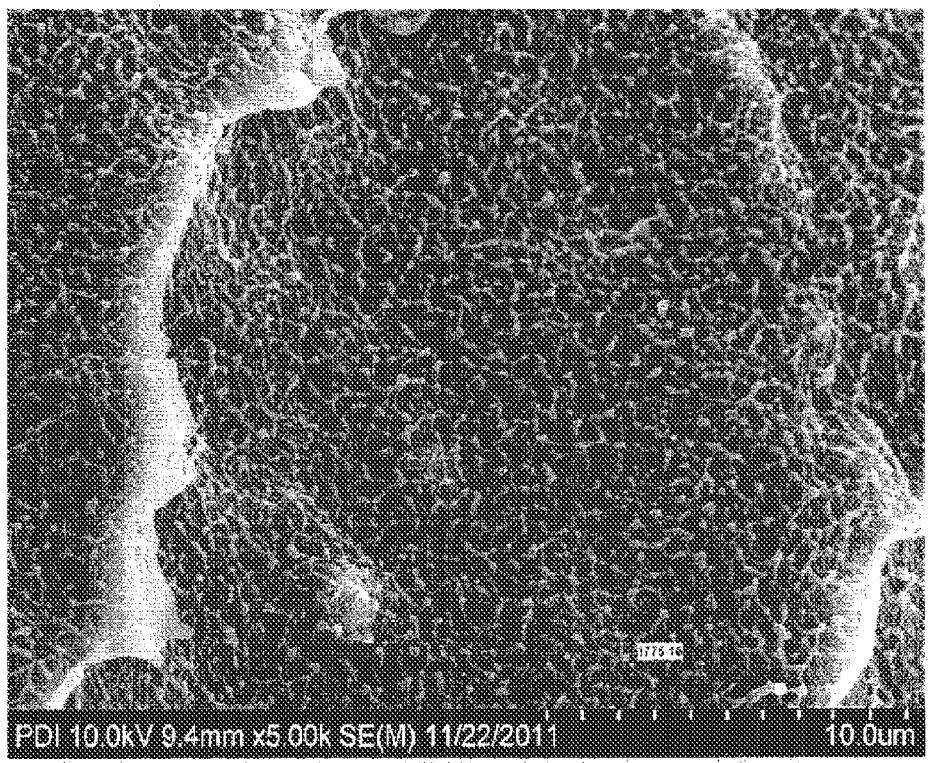
FIG. 4 is a photomicrograph at 5000 magnification of an Example.

FIG. 4 is an image taken of Example 7 and illustrates the unexpected benefits of using Masterbatch IV in forming a composition in comparison to compositions formed using Masterbatch III. That is, in Masterbatch IV we see that an increased amount of fractional melt resin along with the decreased amounts of compatibilizer and oil-softened styrenic block copolymer yield a product 46 in which fly ash particles are submerged beneath the fractured surface of base resin.

Figure 5:
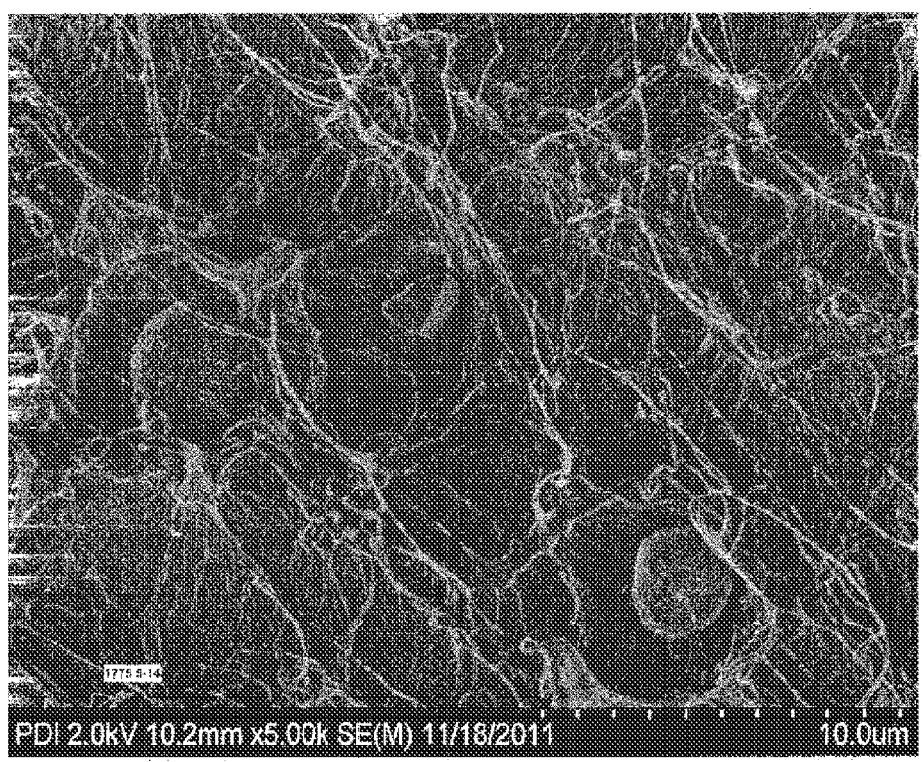
FIG. 5 is a photomicrograph at 5000 magnification of another Example.

FIG. 5 shows Example 6 (Table 3) which can be compared to FIG. 4 that shows Example 7 in that the ingredient formulations are the same. However, Example 6 did not employ a masterbatch. The slightly lower impact resistance of Example 6 compared with Example 7 was also noticeable in FIG. 5 in comparison to FIG. 4. It is believed that the lower impact resistance is related to exposed fly ash particles in base resin sockets with a few tendon connections between particles and socket.

Figure 6:
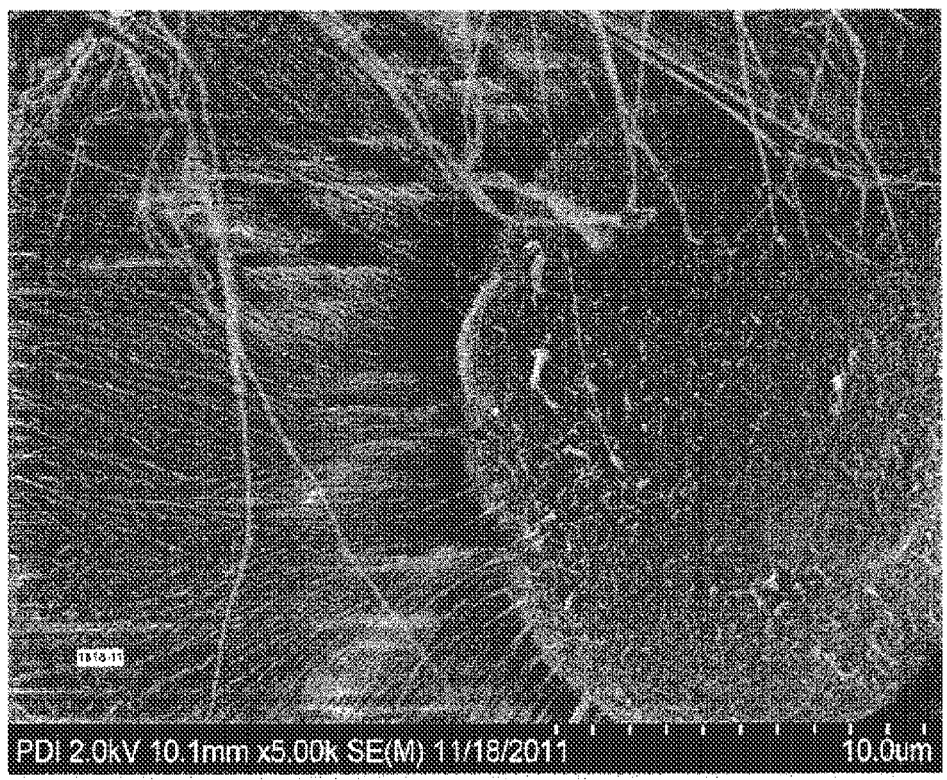
FIG. 6 is a photomicrograph at 5000 magnification of another Example.

Turning now to FIG. 6, it is an enlarged image of Example 8. It shows fly ash particles with a combination of compatibilizer like encapsulator 36, fractional melt resin 60, blend 23 of oil-softened styrenic block copolymer 22 and mineral oil 24 in the ExxonMobil 6605.70 HDPE base resin 42. FIG. 6 shows the tendon connection of fly ash particles to the combination.

Figure 7:
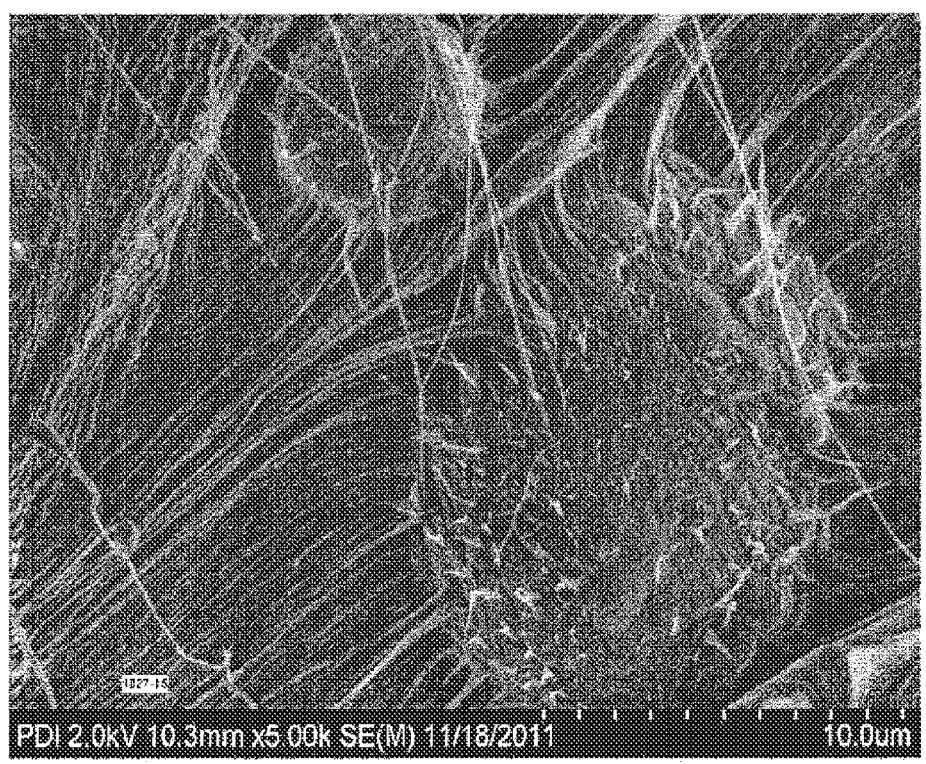
FIG. 7 is a photomicrograph at 5000 magnification of another Example.

FIG. 7 is an image of Example 21 which is a combination of Masterbatch V along with Exxon Mobil 6605 as a base resin 42 with Marlex 5202 and Westlake EN 1807AA as fractional melt resins as shown in Table 5. FIG. 7 shows enhanced tendon connections in comparison to those seen in FIG. 6. The two fly ash particles are intimately and repeatedly connected to the base resin by the many tendons between the particles and resin.

Figure 8:
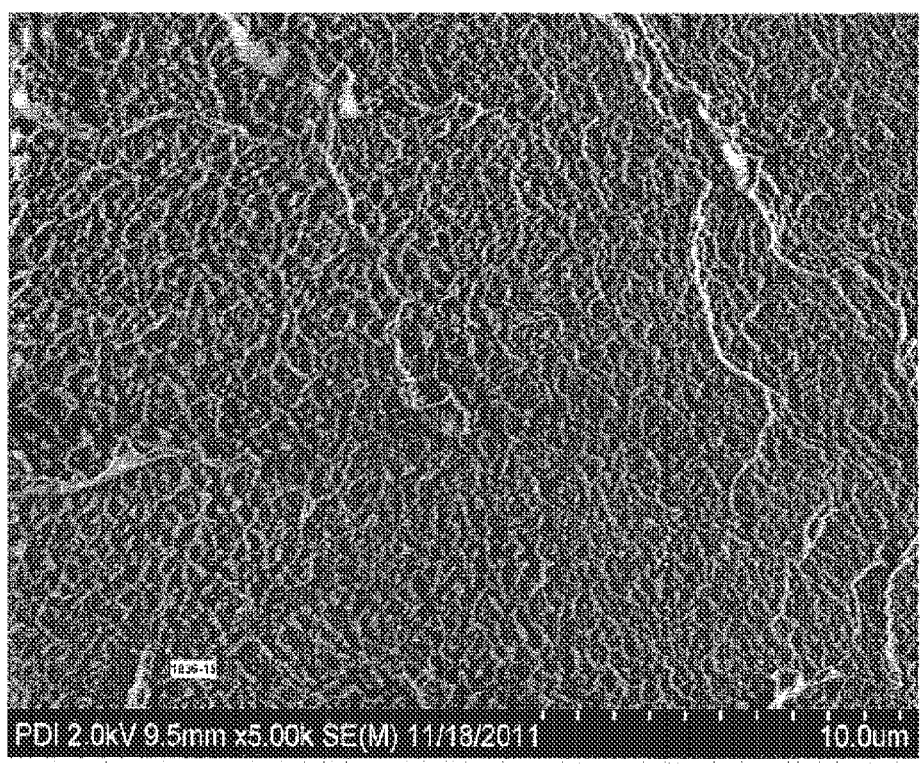
FIG. 8 is a photomicrograph at 5000 magnification of another Example.

FIG. 8 illustrates Example 20 which is a combination of Masterbatch VI along with Exxon Mobil 6605 as a base resin 42 with Marlex 5502 and Westlake EN 1807AA as fractional melt resins as shown in Table 5. FIG. 8 shows further enhanced tendon connections and in turn is an unexpected improvement upon the Examples 6-8 and 21. Use of Masterbatch VI with a combination of fractional melt resin evenly split between Marlex HHM 5502BN HDPE and Westlake EN1807AA HDPE resulted in a cross-sectional fractional view of no fly ash particles, even though they are present at a 15 weight percent loading. The reason fly ash particles are absent from view was because the base resin suffered cohesive failure before the interface between fly ash particles and base resin and a combination of compatibilizer, fractional melt resin, and oil-softened styrenic block copolymer suffered adhesive failure. In other words, the bond between the fly ash particles and the surrounding resin(s) was greater than the resin(s) themselves. Therefore, one can expect the formulations of any of the Examples having measured impact resistances of at least about 11 to have greater adhesive strength between fly ash particles and resin(s) than the cohesive strength of the resin(s) alone.

Sample or Example 20 is a combination that produces a bond between the fly ash particles and the resin material that results on an impact resistance that is substantially enhanced over the impact resistance of the resin by itself. FIG. 8 supports or shows the strength of the bond because the particles are not visible and further supports a belief that the sample, produced as stated, is believed to result in the substantial coating of the fly ash particles with the base resin and a combination of compatibilizer, fractional melt resin, and oil-softened styrenic block copolymer. That is, it is presently believed that the fly ash particles are totally encapsulated. Further, it is believed that compositions that result in the immobilization of fly ash particles produce enhanced impact resistance. The immobilization is apparent in at least FIGS. 6.

As noted before, it is believed that the addition of a blowing agent 16 into the filler blend 18 in the process of preparing the composition 44 or the introduction of the agent 16 via line 15 into the composition 47 as it is being heated as it is about to be formed into a product or object will yield a final product 46 that is less dense. That is, the blowing agent 16 will release gas into the composition 44 or composition 17 as the blowing agent heats up to form a product that is like honey comb in that it has a substantial plurality of voids, spaces and/or pockets in the final product but still has a smooth exterior surface for the product.

TABLE 22

| Masterbatch Materials | | |
|---|---|---|
| Ingredients | VII | VIII |
| Eclipse Fly Ash Blend B (Revolutionary Plastics, Las Vegas, NV) | 70 | 70 |
| Hydrotalcite acid scavenger | 0.35 | 0.35 |
| Chemtura Anox NDB antioxidant | 0.245 | 0.245 |
| Chemtura Alkanox antioxidant | 0.245 | 0.245 |
| Chemtura PolyBond 3009 maleated polyethylene (0.95 Density; 3-6 g/10 min. MFI) | 5 | |
| Chemtura PolyBond 3200 maleated polypropylene (0.91 Density; 115 g/10 min. MFI) | | 5 |
| Kuraray Septon 4033 SBC Flakes | 4.5 | 4.5 |
| Sonneborn 550 Mineral Oil | 0.5 | 0.5 |
| Chevron Marlex HMN ® TR-935 MDPE (0.936 Density; 6.0 MFI) | 19.16 | |
| Marlex 9708 HDPE (0.962 Density; 8.0 MFI) | | 19.16 |
| Total | 100 | 100 |

TABLE 23

| | Example (Wt. %) | | | | |
|---|---|---|---|---|---|
| | U | 65 | 66 | 67 | 68 | 69 |
| | A | | | | | |
| ExxonMobil 6605.70 HDPE (0.948 Density; 5 g/10 min MFI) | 100 | 66.5 | 61.5 | 56.5 | 51.5 | 46.5 |

TABLE 23-continued

|  | | | | | | |
|---|---|---|---|---|---|---|
| Westlake EN1807AAMarlex HHM 5502BN HDPE (0.921955 Density; 0.735 g/10 min. MFI) | 0 | 14.25 | 14.25 | 14.25 | 14.25 | 14.25 |
| Masterbatch VIIWestlake EN1807AA HDPE (0.921 Density; 0.7 g/10 min. MFI) | 0 | 14.25 | 14.25 | 14.25 | 14.25 | 14.25 |
| Masterbatch VII | 0 | 5 | 10 | 15 | 20 | 25 |
| Total | 100 | 100 | 100 | 100 | 100 | 100 |

Test Description
Physical Properties

| | | | | | | |
|---|---|---|---|---|---|---|
| Specific Gravity | 0.94 | 0.96 | 0.99 | 1.01 | 1.04 | 1.06 |

B

| | | | | | | |
|---|---|---|---|---|---|---|
| Shore D Durometer using ASTM D2240 | 63.5 | 63.5 | 63.5 | 63.5 | 64 | 63.5 |

Notched Izod Impact Properties (ASTM D256)

| | | | | | | |
|---|---|---|---|---|---|---|
| Notched IZOD Impact Resistance (ft-lbf/in) | 3.36 | 13.35 | 13 | 12.58 | 12.29 | 12.49 |
| Notched IZOD Impact Strength (ft-lbf/in$^2$) | 8.39 | 33.38 | 32.51 | 31.45 | 30.72 | 31.24 |

Tensile Properties (ASTM D638 Type 4 Rigid)

| | | | | | | |
|---|---|---|---|---|---|---|
| Tensile Strength Stress Yield (psi)$^2$ in/min. | 2,850 | 3,282 | 3,145 | 3,080 | 2,860 | 2,742 |
| Tensile Modulus Youngs Modulus (psi)$^2$ in/min | 98,417 | 107,267 | 104,841 | 114,686 | 109,642 | 98,313 |

C
Flexural Properties (ASTM D790)

| | | | | | | |
|---|---|---|---|---|---|---|
| Flexural Strength Bending Strength @ Peak (lbf/in$^2$) | 1,857 | 1,639 | 1,644 | 1,703 | 1,692 | 1,713 |
| Flexural Modulus Bending Modulus (lbf/in$^2$) | 114,632 | 99,281 | 102,069 | 104,880 | 103,211 | 104,281 |
| Injection Pressure Ave. Peak Injection Pressure | 0 | 0 | 0 | 2,014 | 2,022 | 2,018 |
| DSC - J/g | 153.7 | 108.4 | 120.1 | 115.8 | 111.9 | 108 |

| | Example (Wt. %) | | | | |
|---|---|---|---|---|---|
| | 70 | 71 | 72 | 73 | 74 |

A

| | | | | | |
|---|---|---|---|---|---|
| ExxonMobil 6605.70 HDPE (0.948 Density; 5 g/10 min MFI) | 41.5 | 36.5 | 31.5 | 26.5 | 21.5 |
| Westlake EN1807AAMarlex HHM 5502BN HDPE (0.921955 Density; 0.735 g/10 min. MFI) | 14.25 | 14.25 | 14.25 | 14.25 | 14.25 |
| Masterbatch VIIWestlake EN1807AA HDPE (0.921 Density; 0.7 g/10 min. MFI) | 14.25 | 14.25 | 14.25 | 14.25 | 14.25 |
| Masterbatch VII | 30 | 35 | 40 | 45 | 50 |
| Total | 100 | 100 | 100 | 100 | 100 |

TABLE 23-continued

| | Test Description Physical Properties | | | | |
|---|---|---|---|---|---|
| Specific Gravity | 1.11 | 1.13 | 1.15 | 1.21 | 1.23 |

B

| | | | | | |
|---|---|---|---|---|---|
| Shore D Durometer using ASTM D2240 | 65 | 65 | 65 | 66 | 66 |
| | Notched Izod Impact Properties (ASTM D256) | | | | |
| Notched IZOD Impact Resistance (ft-lbf/in) | 10.98 | 10.2 | 9.71 | 8.55 | 7.94 |
| Notched IZOD Impact Strength (ft-lbf/in$^2$) | 27.46 | 25.51 | 24.27 | 21.38 | 19.84 |
| | Tensile Properties (ASTM D638 Type 4 Rigid) | | | | |
| Tensile Strength Stress Yield (psi)$^2$ in/min. | 2,781 | 2,708 | 2,711 | 2,671 | 2,593 |
| Tensile Modulus Youngs Modulus (psi)$^2$ in/min | 108,333 | 110,233 | 110,085 | 115,473 | 110,249 |

C

| | Flexural Properties (ASTM D790) | | | | |
|---|---|---|---|---|---|
| Flexural Strength Bending Strength @ Peak (lbf/in$^2$) | 1,684 | 1,781 | 1,824 | 1,884 | 1,917 |
| Flexural Modulus Bending Modulus (lbf/in$^2$) | 103,200 | 107,023 | 115,668 | 120,187 | 121,061 |
| Injection Pressure Ave. Peak Injection Pressure | 1,996 | 1,933 | 1,955 | 1,917 | 1,872 |
| DSC - J/g | 99.6 | 95.7 | 91.1 | 81.5 | 74.8 |

TABLE 24

| | Example (Wt. %) | | | | | | | | | | |
|---|---|---|---|---|---|---|---|---|---|---|---|
| | V | 75 | 76 | 77 | 78 | 79 | 80 | 81 | 82 | 83 | 84 |

A

| | | | | | | | | | | | |
|---|---|---|---|---|---|---|---|---|---|---|---|
| Chevron 9005 HDPE (0.945 Density; 6.0 g/10 min MFI) | 100 | 66.5 | 61.5 | 56.5 | 51.5 | 46.5 | 41.5 | 36.5 | 31.5 | 26.5 | 21.5 |
| Westlake EN1807AA-Marlex HHM 5502BN HDPE (0.921955 Density; 0.735 g/10 min. MFI) | 0 | 14.25 | 14.25 | 14.25 | 14.25 | 14.25 | 14.25 | 14.25 | 14.25 | 14.25 | 14.25 |
| Masterbatch VIIWestlake EN1807AA HDPE (0.921 Density; 0.7 g/10 min. MFI) | 0 | 14.25 | 14.25 | 14.25 | 14.25 | 14.25 | 14.25 | 14.25 | 14.25 | 14.25 | 14.25 |
| Masterbatch VII | 0 | 5 | 10 | 15 | 20 | 25 | 30 | 35 | 40 | 45 | 50 |
| Total | 100 | 100 | 100 | 100 | 100 | 100 | 100 | 100 | 100 | 100 | 100 |
| | Test Description Physical Properties | | | | | | | | | | |
| Specific Gravity | 0.94 | 0.96 | 0.98 | 1.01 | 1.04 | 1.06 | 1.1 | 1.12 | 1.15 | 1.18 | 1.24 |
| Shore D | 62 | 62.5 | 63 | 63 | 64 | 64 | 64.5 | 64.5 | 65 | 65 | 65.5 |

B

| | Notched Izod Impact Properties (ASTM D256) | | | | | | | | | | |
|---|---|---|---|---|---|---|---|---|---|---|---|
| Notched IZOD Impact Resistance (ft-lbf/in) | 8.85 | 14.38 | 14.39 | 13.74 | 13.1 | 12.52 | 11.82 | 11.45 | 10.17 | 9.46 | 9.31 |

TABLE 24-continued

| | Example (Wt. %) | | | | | | | | | | |
|---|---|---|---|---|---|---|---|---|---|---|---|
| | V | 75 | 76 | 77 | 78 | 79 | 80 | 81 | 82 | 83 | 84 |
| Notched IZOD Impact Strength (ft-lbf/in$^2$) | 22.12 | 35.96 | 35.97 | 34.34 | 32.76 | 31.3 | 29.55 | 28.61 | 25.43 | 23.65 | 23.27 |
| Tensile Properties (ASTM D638 Type 4 Rigid) | | | | | | | | | | | |
| Tensile Strength Stress Yield (psi)$^2$ in/min. | 2,306 | 2,609 | 2,548 | 2,597 | 2,608 | 2,617 | 2,623 | 2,621 | 2,559 | 2,563 | 2,491 |
| Tensile Modulus Youngs Modulus (psi)$^2$ in/min | 69,346 | 91,642 | 87,727 | 86,527 | 91,015 | 93,044 | 106,457 | 101,440 | 110,741 | 128,217 | 116,353 |
| Flexural Properties (ASTM D790) | | | | | | | | | | | |
| Flexural Strength Bending Strength @ Peak (lbf/in$^2$) | 1,526 | 1,474 | 1,537 | 1,540 | 1,597 | 1,627 | 1,719 | 1,700 | 1,785 | 1,800 | 1,909 |
| Flexural Modulus Bending Modulus (lbf/in$^2$) | 93,404 | 89,935 | 93,755 | 92,044 | 96,809 | 97,804 | 104,366 | 101,562 | 108,104 | 108,673 | 121,298 |
| C Injection Pressure | | | | | | | | | | | |
| Avg. Peak (lb/in$^2$) Injection Pressure | 2,109 | 2,023 | 2,051 | 2,065 | 2,088 | 2,005 | 2,002 | 1,961 | 1,954 | 1,955 | 1,898 |
| DSC J/g* | 124.8 | 115.6 | 111.1 | 108.6 | 102.3 | 101.1 | 94.9 | 92.1 | 88.1 | 83.7 | 77.6 |

*Differential Scanning Calorimetry Joules/gram

TABLE 25

| | Example (Wt. %) | | | | | | | |
|---|---|---|---|---|---|---|---|---|
| | W | 85 | X | 86 | Y | 87 | Z | 88 |
| A | | | | | | | | |
| Chevron ALN-070 "No Break" Polypropylene Copolymer (0.9 Density; 7 MFI) | 100 | 50 | | | | | | |
| Generic "No Break" Polypropylene Copolymer (11 MFI) | | | 100 | 50 | | | | |
| Flint Hills AP7310-HS "No Break" Polypropylene Copolymer (0.9 Density; 10 MFI) | | | | | 100 | 50 | | |
| B | | | | | | | | |
| CPPP.1220G BLACK "No Break" Polypropylene Copolymer (9.5-11.0 MFI) distributed by PolyOne Corporation | | | | | | | 100 | 50 |
| Masterbatch VIII | | 21.5 | | 21.5 | | 21.5 | | 21.5 |
| Marlex HHM 5502BN HDPE (0.955 Density; 0.35 g/10 min. MFI) | | 28.5 | | 28.5 | | 28.5 | | 28.5 |
| Total | 100 | 100 | 100 | 100 | 100 | 100 | 100 | 100 |
| Notched Izod Impact Properties (ASTM D256) | | | | | | | | |
| Impact Resistance (ft-lbf/in) | 3 | 7 | 3 | 7.7 | 2.6 | 4.9 | 2.5 | 4.1 |
| Impact Strength (ft-lbf/in$^2$) | 7.6 | 17.5 | 7.4 | 19.2 | 6.5 | 12.1 | 6.1 | 10.3 |
| C Tensile Properties (ASTM D638 Type 4 Rigid) | | | | | | | | |
| Tensile Strength Stress Yield (psi)$^2$ in/min. | 3,108 | 3,013 | 3,211 | 3,072 | 3,143 | 3,364 | 2,946 | 3,368 |
| Tensile Modulus Youngs Modulus (psi)$^2$ in/min | 157,750 | 161,864 | 159,950 | 157,803 | 152,709 | 176,717 | 142,659 | 169,810 |
| Flexural Properties (ASTM D790) | | | | | | | | |
| Flexural Strength Bending Strength @ Peak (lbf/in$^2$) | 2,874 | 2,345 | 2,610 | 2,093 | 2,351 | 2,361 | 2,378 | 2,367 |

TABLE 25-continued

| | Example (Wt. %) | | | | | | | |
|---|---|---|---|---|---|---|---|---|
| | W | 85 | X | 86 | Y | 87 | Z | 88 |
| Flexural Modulus Bending Modulus (lbf/in$^2$) | 148,468 | 134,700 | 136,692 | 122,047 | 124,915 | 138,151 | 126,079 | 138,552 |

Examples 65-74 identify alternative embodiments in which the fractional melt is not included or mixed with the masterbatch material but rather added to the final formulation being molded. That is, the Masterbatch VII is mixed with the fractional melt material and another resin as it is ready to be heated and molded. For Examples 65-74, two different fractional melt resins were used and kept at a constant weight percent, with the conventional higher melt flow resin and Masterbatch VII decreasing and increasing in tandem, respectively.

Table 23 demonstrates the truly unexpected result that Notched Izod impact resistance is maximized with the minimum amount of usage of masterbatch. However, even at 50 weight percent usage, Notched Izod impact resistance is more than double the amount of the neat higher melt flow resin. Also, though specific gravity trends upward, the Shore D hardness remains relatively constant. Finally, tensile and flexural moduli are relatively consistent across the range of increased amount of masterbatch and fractional melt resin in Examples 65-74, but time to onset of crystallization as measured by DSC in Joules/gram demonstrates a significant and unexpected improvement in nucleation of those Examples 65-74 over the neat resin of Comparative Example U. Moreover, a faster onset to crystallization can improve cycle time of molding plastic articles sequentially made from compounds disclosed. From the above including Table 23, it can be seen that one can tailor formulations of the present invention as demonstrated in Examples 65-74 into any molded plastic article having nearly any desired combination of impact resistance, tensile modulus, flexural modulus, and other structural characteristics, using the three component combination of neat resin, fractional melt resin(s), and masterbatch containing an effective amount of maleated polyethylene.

Table 24 essentially confirms the results of Table 23, except using a different conventional higher melt flow polyethylene resin, commercially available and often used in the molding of plastic articles. Examples 75-84 progress with increasing amounts of masterbatch over the conventional resin of Comparative Example V with similar unexpected results as seen for Examples 65-74. Again, two different fractional melt resins were used, and their weight percents were held constant for these experiments. Table 24 therefore demonstrates the robustness of the present invention based on the use of a different conventional polyethylene resin than used in the Examples 65-74 shown in Table 23.

Table 25 is organized to show a shift from 100% neat resin of different melt flow grades of four polypropylene copolymers to 50% of those neat resins, respectively with about 22% of Masterbatch VIII (containing a maleated polypropylene) and about 28% fractional melt resin added. The mixtures and the performance of the compositions using the Masterbatch VIII remain essentially constant in amount across the four Examples 85-88. Significantly, and unexpectedly, there was no incompatibility noted in the blending of a fractional melt high density polyethylene or a polyethylene carrier in Masterbatch VIII with a polypropylene copolymer. Generally, Table 25 demonstrates that one can replace as much as 50% polypropylene copolymer "no break" resin with the combination of fractional melt HDPE and masterbatch having HDPE masterbatch carrier and maleated polypropylene without adverse affecting the physical properties of the conventional neat resin. Moreover, unexpectedly, one can actually improve the physical properties of impact resistance in every instance for every melt flow grade tested.

When comparing performance results in Tables 23, 24 and 25, other than flexural modulus which decreased slightly, all other physical properties measured were relatively consistent between the Comparative Example without the fractional melt resin and the masterbatch. As with a polyethylene resin explored in Tables 23 and 24, the comparison between Comparative Examples W-Z and Examples 85-88, respectively, teach that one is able to utilize the fractional melt polyethylene resin and the masterbatch containing a maleated polypropylene with a polypropylene copolymer "no break" resin to achieve increased impact resistance without deleterious change to other physical properties.

From Tables 23-25, it can be seen that one can use fly ash with polyethylene in an amount as little as 3.5 weight % (Examples 65 and 75) and as much as 35 weight % (Examples 74 and 84) in order to achieve superior physical properties over the same polyethylene alone, particularly impact resistance, if fractional melt resin is also present. The masterbatch formulation, such as Masterbatch VII, significantly contains maleated polyethylene, as used in prior embodiments, to achieve superior impact resistance.

Significantly, these Examples 65-84 demonstrate that the fractional melt resin(s) need not be in the masterbatch in order to obtain these superior results. Therefore, it is possible to have both the benefits of a masterbatch easier to make because of the absence of the less flowing fractional melt resin(s) and the benefits of a molded plastic article because of the presence of the fractional melt resin(s). The molding conditions unexpectedly are sufficiently tolerant of the fractional melt resin(s) being added without previous melt mixing with the other ingredients of the masterbatch. The use of two different fractional melt resins in Examples 65-84 demonstrate that neither fractional melt resin is disruptive to molding conditions.

Considering the trends from Examples 65 and 75 to Examples 74 and 84, it is quite unexpected that one can replace conventional higher melt flow polyethylene resins (having a higher cost relative to fractional melt resins) with the combination of fractional melt resin(s) and masterbatch of the as disclosed to achieve improved and indeed superior impact resistance without loss of other physical properties. The superior impact resistance while maintaining consistent other physical properties as seen in tables 23-25 is being achieved using only 21.5% of conventional polyethylene resin remaining in Examples 74 and 84—a 79.5% reduction in content as compared with Comparative Examples U and V—is quite unexpected.

Examples 85-88 are of particular significance as they demonstrate that a polyethylene fractional melt resin can be used with a masterbatch that has or uses fly ash (in a polyethylene carrier along with maleated polypropylene) in an amount of about 22 wt. % in polypropylene copolymer in order to achieve superior physical properties over the same polypropylene. Notably there is significant improvement in impact resistance when fractional melt resin is also present.

Also significantly, as with the polyethylene Examples 65-84, the fractional melt resin need not be present in the masterbatch to achieve these results, allowing for a less complicated manufacture of masterbatch and a superior final plastic article.

It is contemplated that a series of examples for polypropylene copolymer using the same progression as seen in Tables 23 and 24 for polyethylene will yield similar results as seen in Tables 23 and 24 for polyethylene copolymer.

Additional tests have demonstrated that one can reduce the amount of Polybond® maleated polyolefin compatibilizer or oil-softened Septon® styrenic block copolymer from 5 weight percent to 1 or 2 weight percent and achieve acceptable Notched Izod impact resistance properties when compared to the neat resin. These masterbatches, even though less performing when compared with Masterbatches VII and VIII in Table 22, are nonetheless commercially valuable when a similar impact resistance property is desired for a plastic article using a less expensive masterbatch, thus an overall less expensive compound, thereby producing a less expensive but fully functional molded plastic article.

Referring back to Table 22, the MasterBatch material VII shown is quite similar to MasterBatch VI except that it includes HDPE with a MFI of 8 instead of a MDPE like Chevron TR 935 material. This Masterbatch VII is then processed with a fractional melt like fractional melt 60 and base resin like base resin 42 to form a composition 47 into which one inserts or adds the blowing agent 16 via line 15 as the compositon 47 is being heated and thereafter mechanically processed 48 into work product 46. In material with blowing agent formed as seen in Table 23, the hardness and other physical properties are expected to be better than the base resins that are seen in the tables 1-21 above.

The enhanced benefits from the combination of the blowing agent with a composition having fly ash as the filler was not heretofore appreciated. Typically, the Blend B fly ash used in the formation of a Masterbatch or a composition as herein disclosed will have by count many more smaller particles of fly ash than larger particles. It is believed that the smaller particles (which are those less than 1 micron in effective diameter) are about 95% of any given number while being by mass about 8% to 11% of mass of the fly ash of that volume. Thus, the larger particles (greater than 1 micron) are by mass about 90% of any given volume. Without being limited to a particular theory, it is presently believed that the multiplicity of particle sizes dominated by the smaller particles contributes to a reduced or lower viscosity during the melt phase leading to improved dispersion and distribution of the smaller particles. At the same time, it is believed that the lower viscosity leads to enhanced flow characteristics so that less pressure is needed in processing (e.g., injection molding); and less energy (e.g., electricity) is needed to process into a final product. Indeed, temperatures can be kept lower leading to further energy savings while wear or erosion is minimized in relation to the use of more abrasive particles like gold.

Figure 9:
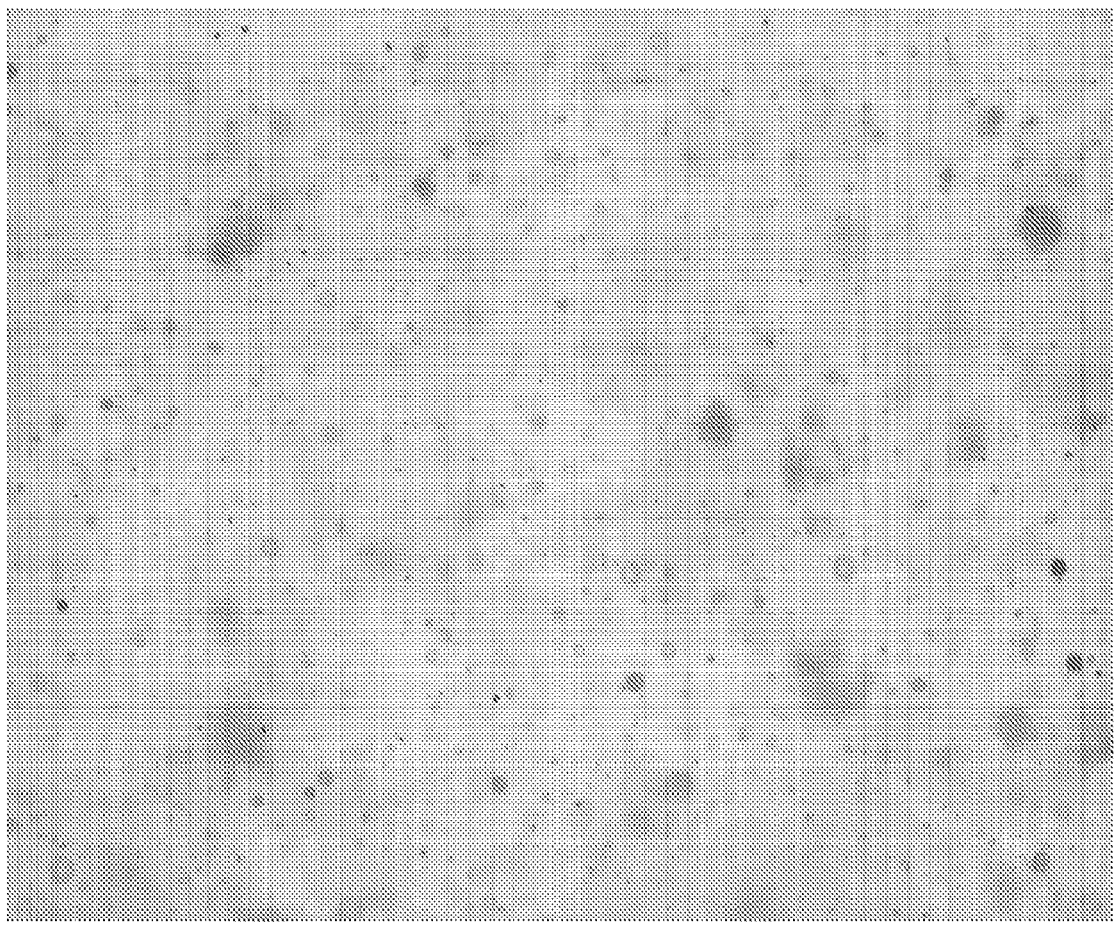
FIG. 9 is a photograph at 10× magnification of a cured polyethylene material using a mechanically processed fly ash as a filler.

FIG. 9 is a photograph of solid cured polyethylene material that has Blend B added in a melt phase. The small dark spots of the type identified by the arrow show the good dispersion of the particles in the composition. The large number by count of the smaller particles are believed to aid in the nucleation of gas bubbles as the blowing agent converts to a gas or is decomposing from its solid form to a gas form. More specifically, it is believed that the presence of the large quantity of the smaller filler particles leads to the formation of a material in which the pockets or bubbles are considerably smaller in size. That is, there is greater dispersion and in turn, finer (smaller in size) bubbles/pockets and more uniform distribution of the bubbles/pockets. Thus one may avoid use of supercritical carbon dioxide to aid in the formation of reduced cell sizes (e.g., less than 0.05 micron) as taught by Zhai et al, *Heterogeneous Nucleation Uniformizing Cell Size Distribution In Microcellular Nanocomposites Foams* (Beijing National Laboratory for Molecular Sciences, et al, available on the world wide web at www.sciencedirection.com, 7 Sep. 2006).

There are reports that nano particles such as gold nanoparticles are used to change or improve properties of various compositions. NanoPartz™ of Loveland, Colo. offers a line of such nano particles. But is believed that the use of such particles is limited as it is believed that volumes of such nano particles in excess of 1% by weight lead to clumping and reduce advantages and change the flow properties. The use of an inorganic filler and more particularly the use of fly ash has avoided the problems and results in better dispersion and nucleation with enhanced flow characteristics as seen in FIG. 9.

It is also believed that the nucleation or size of the bubbles or holes can be controlled by using inorganic fillers such as fly ash with different particle size distribution. That is, Blend B used to make the Masterbatch VII in Table 22 has particles that range from 200 nanometers up to 250 microns. Reducing the range of size from that used in Blend B to, for example, 200 nanometers to about 10 microns or about 50 microns is believed to reduce the cell structure or smaller and more holes or bubbles in the final cured composition while further reducing or controlling the viscosity and energy consumption during processing.

Figure 10:
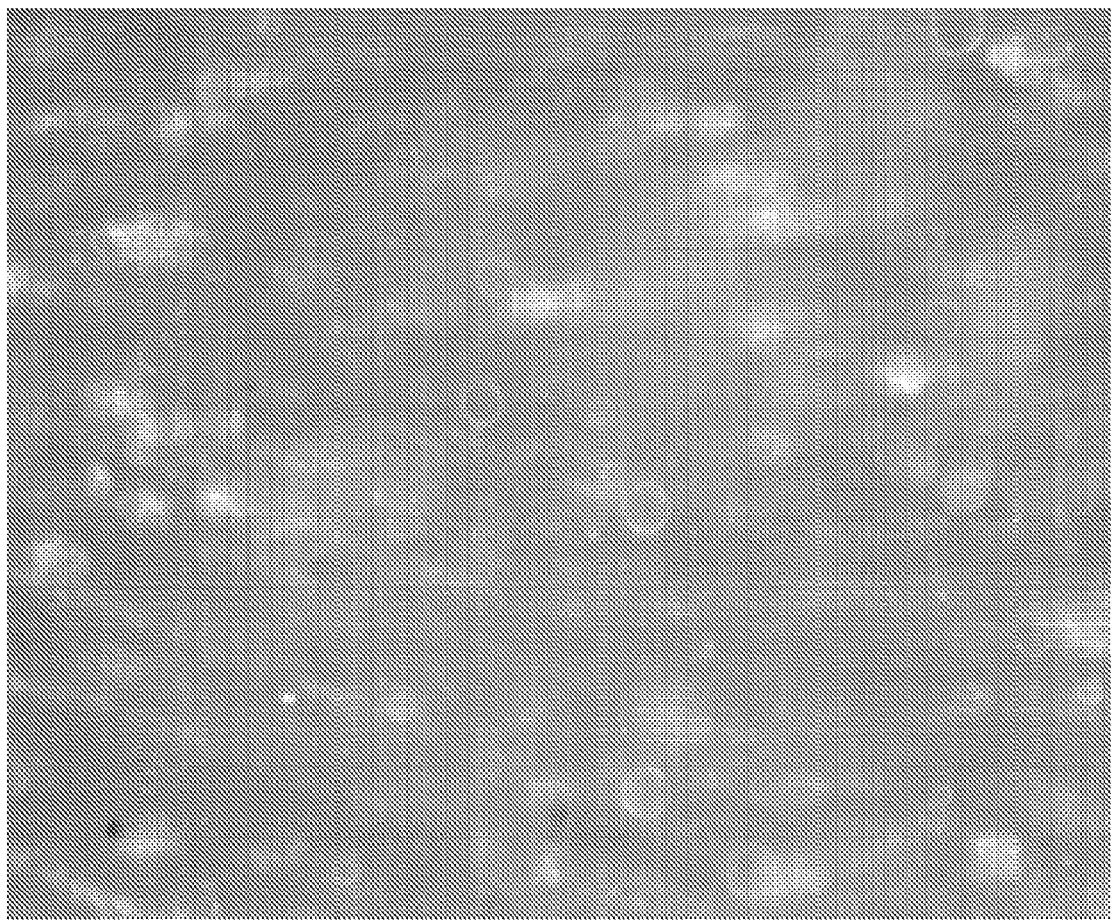
FIG. 10 is a photograph at 50× magnification of another cured polyethylene material using a mechanically processed fly ash as a filler.

Turning now to FIG. 10, it is a photograph of a solid cured polyethylene resin. It is made using Blend B but without a foaming agent or colorant. The particles are well dispersed or relatively evenly distributed throughout the structure. This photograph shows the results of using an inorganic filler like fly ash with a particle size distribution having a large percentage of small particles. Indeed, it is believed that the distribution can be controlled by using an inorganic filler like fly ash in which more than 50% and up to 99% of the total particles are less than 1 micron in effective diameter.

Figure 11:
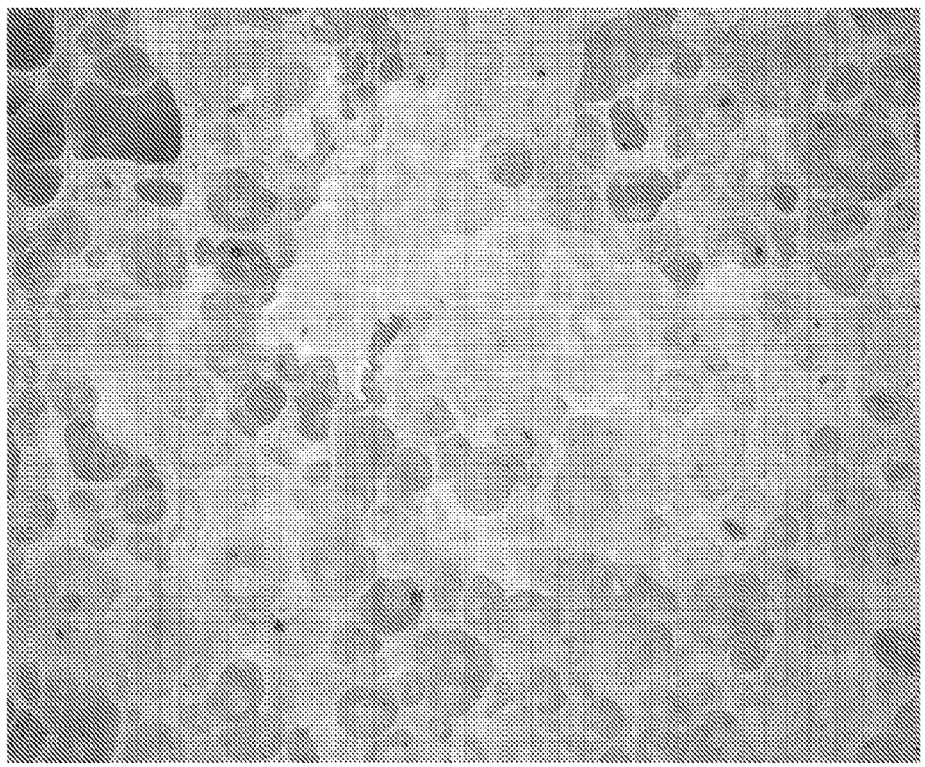
FIG. 11 is a photograph at 5× magnification of a cured polyethylene material with a blowing agent added to the masterbatch and then processed into the masterbatch pellet.
Figure 12:
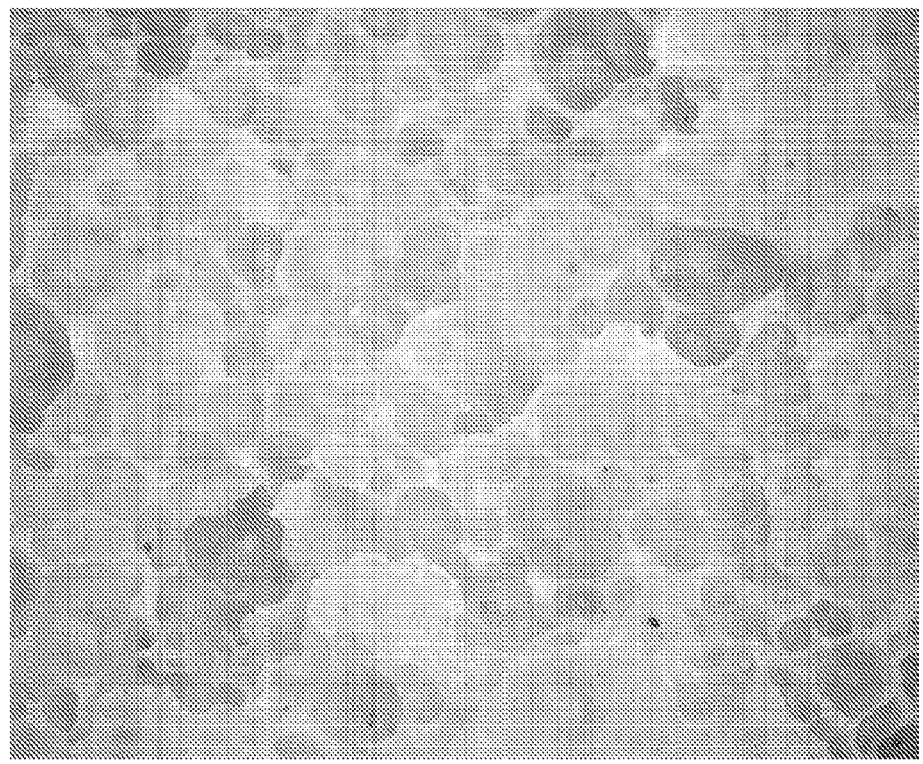
FIG. 12 is a photograph at 10× magnification of a cured polyethylene material with a blowing agent added to the final composition (at the throat of the press) just before the extrusion or injection process.

FIGS. 11 and 12 are images of samples made in which 0.3225% of a blowing agent such as Baothr has been used. Baothr is an endothermic blowing agent in powder form available from PolyOne Corporation of Avon Lake, Ohio. In FIG. 11 the Baothr blowing agent was added into the Masterbatch VII with the HDPE reduced by that amount. Thereafter the Masterbatch VII as modified was mixed with a base resin and processed using normal manufacturing procedures resulting in the production of the sample. From FIG. 11, it can be seen that the cell structure is regular with consistent small cells throughout. The cell sizes are believed to range from about 30-150 microns in effective diameter with the average as can be best estimated at about 96.06 microns. That is, the addition of the foaming agent into a masterbatch to be used with a base resin in the normal manufacturing process was found to be viable and lead to desired nucleation and dispersion.

FIG. 12 shows with the 0.3225% Baothr foaming agent added to the composition of the Masterbatch like Masterbatch VII and a base resin in the final mixing before mechanical processing (or at the throat of the press or extruder) (e.g., injection molding) into a product. While adequate or sufficient nucleation is evident and adequate dispersion is apparent, it is clear that nucleation and dispersion is not as regular or as even as seen in FIG. 11. In FIG. 12, cell sizes were seen to range from about 25 to about 300 microns.

Figure 13:
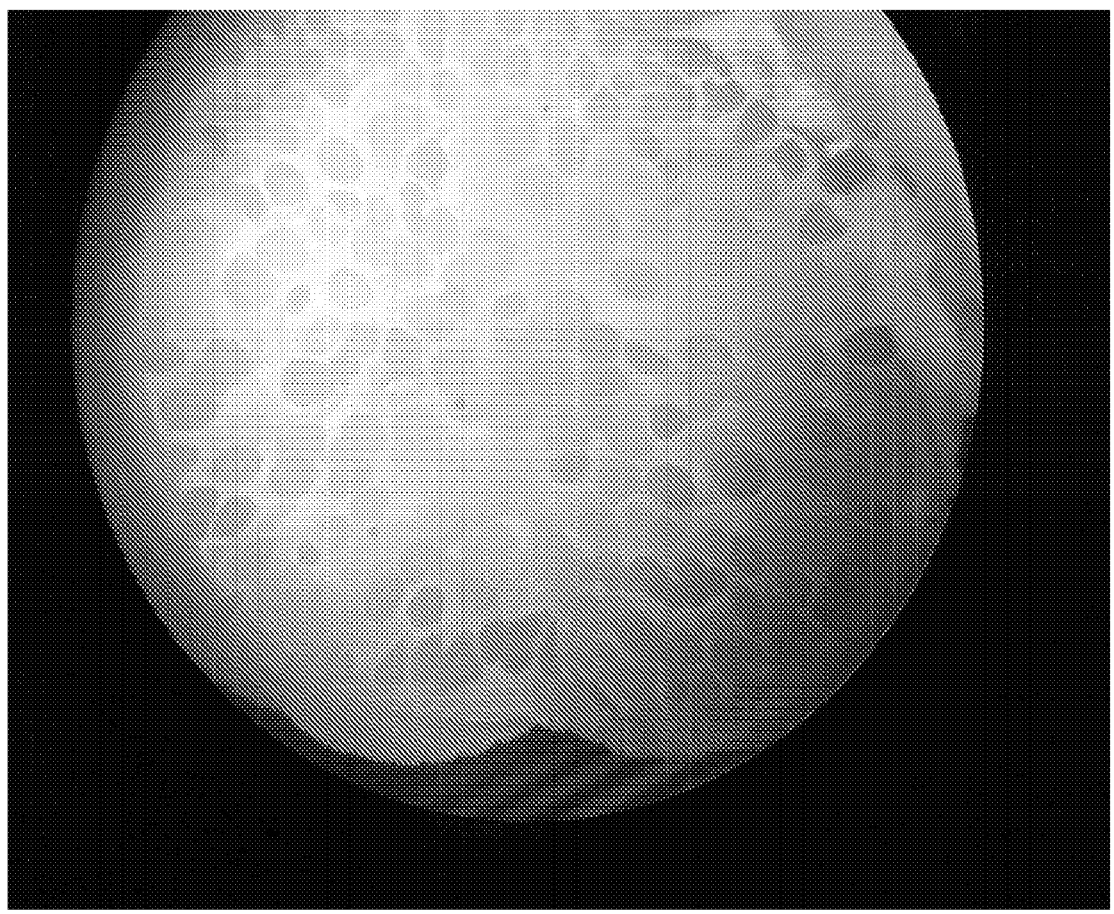
FIG. 13 is. a photograph at about 10× magnification of a cured polyethylene material with a blowing agent added but without any masterbatch that includes a mechanically processed fly ash filler.
Figure 14:
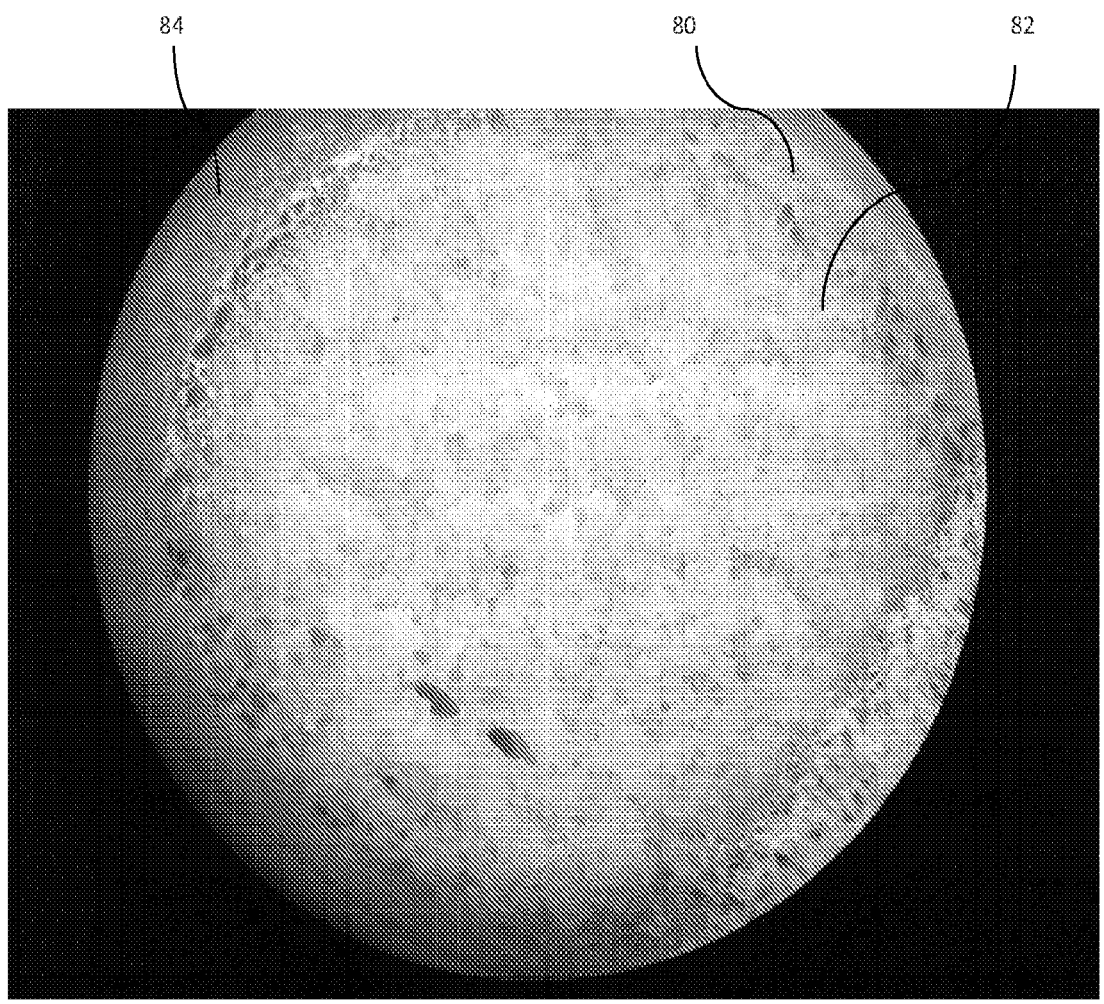
FIG. 14 is a photograph at about 10× magnification of a cured polyethylene material with the same blowing agent and the same amount of blowing agent as was added to the sample in FIG. 13 along with a mechanically processed fly ash in a masterbatch.

To show the structural differences, FIG. 13 is a photograph enlarged or at a magnification of about 10× of a cross section from a structural foam tube (about ½ inch in diameter×5" inch in length) made of high density polyethylene resin having a melt flow index of about 8 with a blowing agent but without a masterbatch made with Blend B. That is, the material of FIG. 13 does not include any fly ash and has a large irregular cell structure. In turn the mechanical properties of the product will be inconsistent if not unacceptable. In comparison, FIG. 14 is a photograph at the same magnification as FIG. 13 of a cross section from a structural foam tube (about ½ inch in diameter×5" inch in length) of about the same size as that of FIG. 13. The tube of FIG. 14 is also made of the same high density polyethylene resin having a melt flow index of about 8; but it now includes and is mixed with a masterbatch made using Blend B (which includes fly ash) and with the same amount of the same blowing agent. In FIG. 14, a piece was cut off forming edge 80 to show the interior 82 with excellent dispersion of small cells in the interior and encapsulation of the particles of fly ash while the tube itself has a smooth exterior surface 84. The dispersion and in turn the cells are more evenly distributed and smaller cells leads to a product that is more consistent with predictable preferred mechanical properties. With the use of a filler material such as fly ash, it has also been noted that the processing procedures are not adversely affected but rather enhanced because thermal conductivity has not been reduced due to the formation of cells or holes in the material. Rather, it is believed that the fly ash contributes to or enhances thermal conductivity. Also, there is also a more rapid crystallization of the polymer which is assumed to be due to the multiple nucleation sites from the many particles under 1 micron.

With the use of a masterbatch like Masterbatch VII, it should also be understood that compositions can be formed using fractional melt in addition to the base resin. Fractional melt (especially in its recycled or reclaimed regrind form) is desired because it is understood to be less expensive than base resin or virgin resin. It can be used with Masterbatch VII without adversely affecting the processing. That is, the processing pressures and temperatures can remain about the same or even lowered in some instances while processing pressures and temperatures without the use of an inorganic filler like fly ash are notably higher. As seen in Table 26, fractional melt is used to form a composition to produce a product comparable to what is seen in FIG. 14. The amount of fractional melt can vary from a nominal amount of 1% up to about 75% in some applications.

TABLE 26

Foamed Material

| Weight PerCent | Material |
|---|---|
| 28.5% | Fractional Melt |
| 49% | Base Resin |
| 1% | Blowing Agent |
| 21.5% | Masterbatch |
| 100 | Total |

Figure 15:
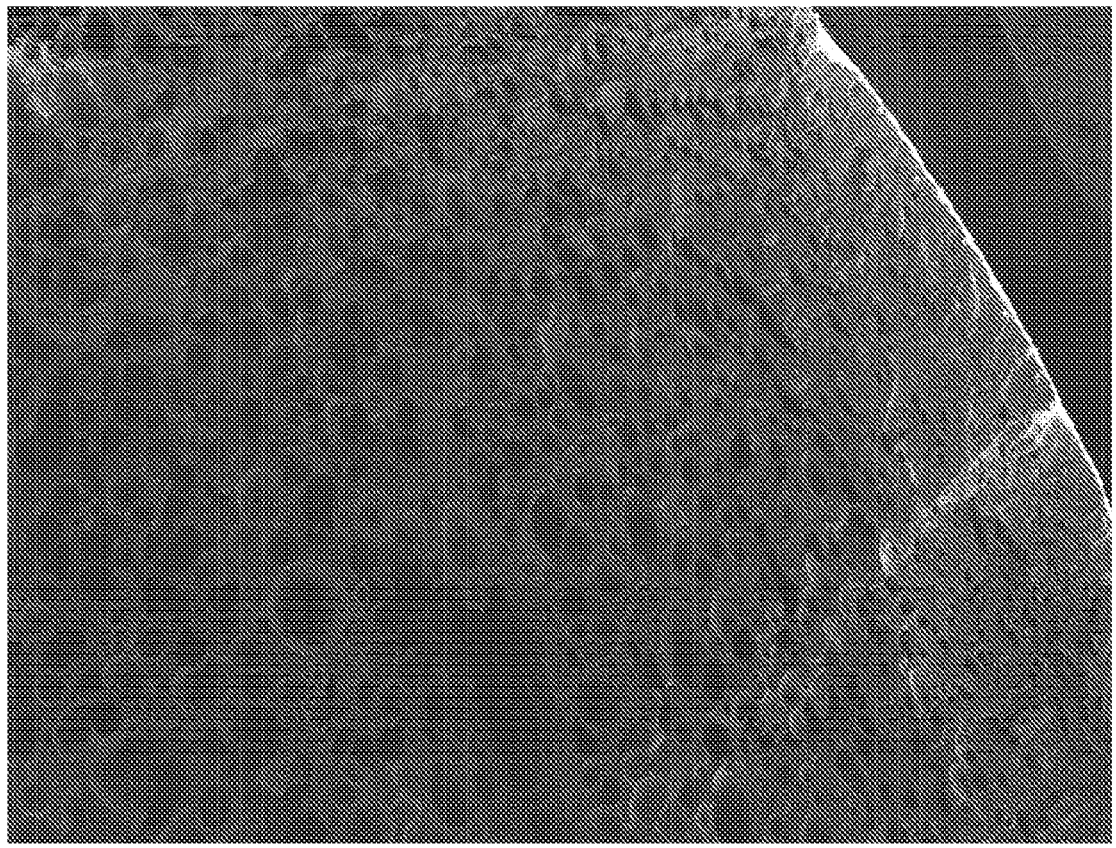
FIG. 15 is a photograph at 30× magnification of cured polyethylene material of FIG. 14 with a blowing agent added to the masterbatch which includes fly ash as a filler.
Figure 16:
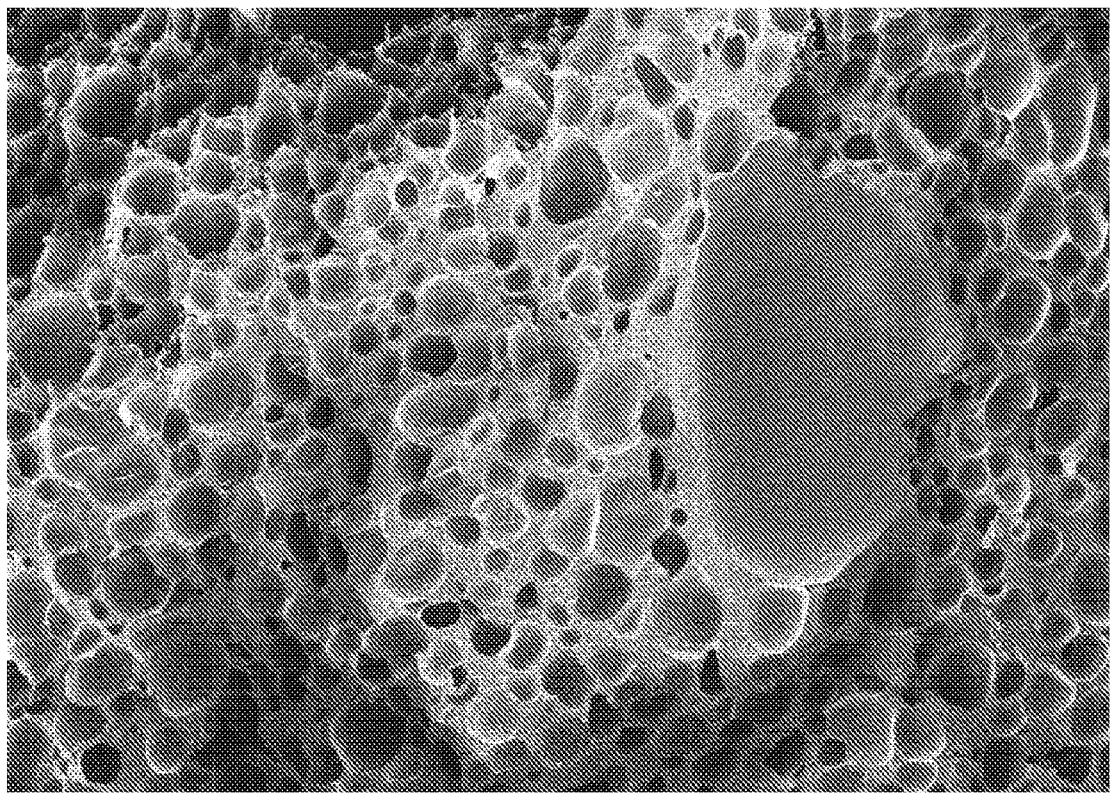
FIG. 16 is a photograph at 30× magnification of a cured polyethylene material of FIG. 15 with a blowing agent added to the masterbatch.
Figure 17:
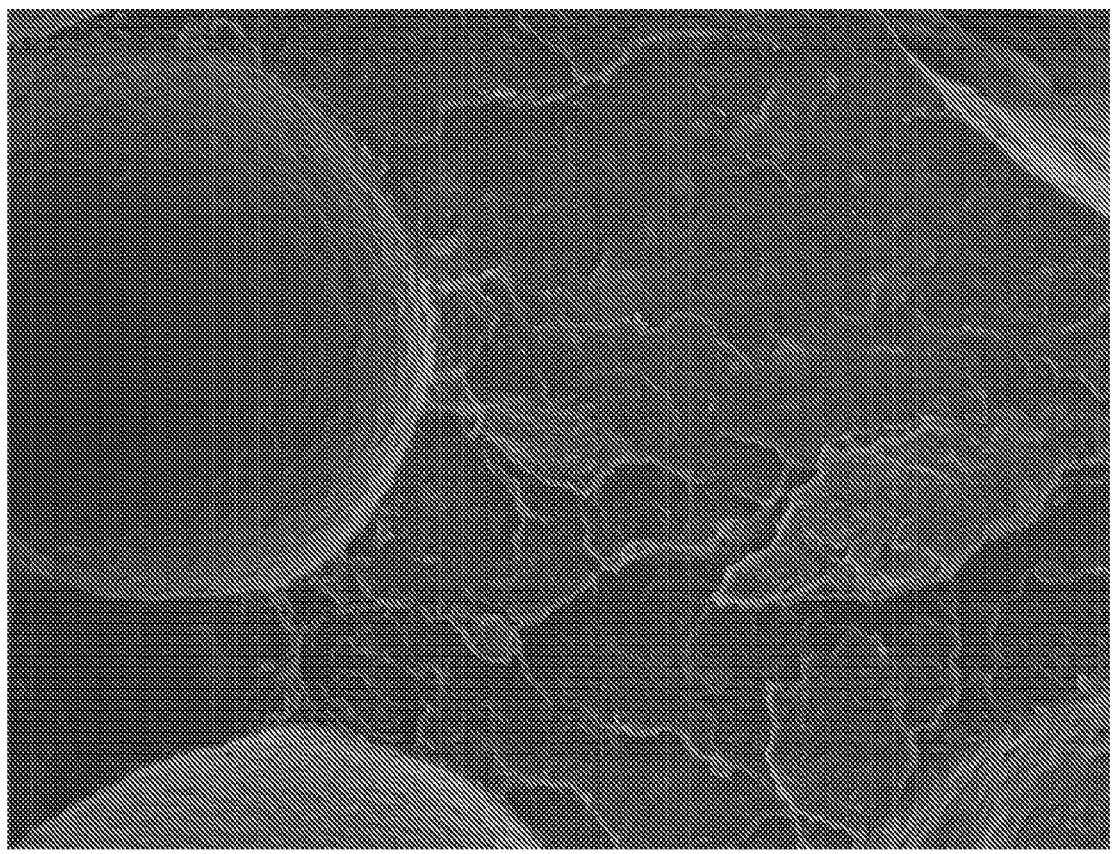
FIG. 17 is a photograph at 500× magnification of a cured polyethylene material of FIG. 16.

In reference to the blowing agent, the type selected will vary based on the process. For example, endothermic reactions may be preferred in some applications and processes with exothermic reactions may be preferred in yet others. Endothermic reactions typically produce carbon dioxide ($CO_2$) to form and fill the holes in the material as it hardens. Nitrogen ($N_2$) is typically a gas from an exothermic reaction to form and fill the holes. Blowing agents of different types and kinds can be found by Typical blowing agents include, but are not limited to isocyanate mixed with water, hydrazine, and sodium bicarbonate. Blowing Agents such as the Foamazol™ line of foaming agents are available from Bergen International of Hasbrouck Heights, N.J. LaxNess of Leverkusen, Germany offers a line of Genitron® powder blowing agents. Blowing agents may impact on other physical properties including flowability or rheology during processing. FIGS. 15-17 are photographs taken of the cross section of the rod of FIG. 14 with an enlarging microscope. FIG. 15 shows the cells or holes formed with relative even distribution and all sized in a range that is small. FIG. 16 is a photograph of the same cross section of FIG. 14 but enlarged to show the holes or cells as they are dispersed. A large area in FIG. 16 shows a large cell perhaps formed because mixing was not thorough or complete. FIG. 17 is yet a further enlargement showing the relative uniform spherical shape of the cells with the others materials relatively evenly mixed holding the hollow cells.

While the formulations set forth above involve the use of a fly ash filler, it should be further understood that other compositions can be formulated using the basic teachings as set forth hereinbefore that do not include fly ash/and or cinders or any other filler.

That is, certain thermoplastic resins are selected to manufacture products that will exhibit desired physical properties. Some products need to be soft or flexible while others need to be tough and hard. Polyethylene and polypropylene are typically selected for products that need to have good impact resistance (toughness) and good tensile and flexural strength (stiffness). Such materials and their equivalents are typically used without fillers or similar additives.

One example of unmodified thermoplastic resin is generally known as "no break" polypropylene copolymer. The compositions of the present invention can dramatically increase impact resistance with comparable or better tensile strength and flexural strength using a high density polyethylene (HDPE) thermoplastic resin which is less expensive than the "no break" polypropylene copolymer.

While the compositions being formed as disclosed in connection with FIG. 1 may include a variety of fillers from sawdust to glass balls to fly ash, it should be understood that compositions may be formed without any filler as well as compositions with any other filler acceptable to produce a desired product with desired physical properties.

It should be understood that other additives can be supplied to be mixed 26 into resin with or without the filler. For example, colorants could be added at this early stage as well as other dry materials that may be desirably mechanically mixed or blended. In some cases the compatibilizer will be liquid silane. The amount of liquid silane used is so small or limited that it can be added to the blend filler 18 or it can be mixed 26 into the composition without a filler.

A suitable mineral oil 24 is mixed with a high performance stryrenic block copolymer 22. The resulting blend 23 softens and enhances the flowability of the composition 44 when in melt form as it is mixed 26 while contributing to the strength and elasticity of the final product 46. That is, the base resin 42 and the masterbatch 38 create a composition in melt form that could wet the surfaces of the processing equipment and reduce the production cycle time or throughput time. Adding the blend 23 of the mineral oil 24 and the copolymer 22 contributes to the flowability of the composition 44 and is also believed to contribute to the toughness of the product 46. In practice, it has been found that SEPTON® 4033 flakes available from Kuraray America, Inc. of Houston, Tex. are particularly useful as the copolymer 22. Hydrobite® 550 PO white mineral oil offered by Sonneborn, LLC of Mahwah, N.J. has been found to be particularly useful as the mineral oil 24. In use, it has been found that the blend 23 is best when mixed in a ratio of about nine units of copolymer 22 to one unit of oil 24. Other similar mineral oils such as Penreco® Drakeol® mineral oil are also believed to be suitable for use.

The scope of this disclosure is not limited to the above embodiments and samples presented in the above Tables 1-21. The many Examples provided demonstrate that fly ash can be presented as an acceptable filler 10 and used with different amounts and different types of the various ingredients to result in or produce a final product 46 that has selected physical properties. The combination of fly ash, fractional melt resin, compatibilizer, and a blend of oil-softened styrenic block copolymer, preferably in combination with resins to create a masterbatch that are further combined with base resins including fractional melt resins, are less expensive than base resins by themselves, easier to process and thus are better performing than known base resins alone and have better physical properties than base resins alone. Simply stated, the user can chose how to vary the ingredients to attain the desired better physical properties, and the user can make products that are less expensive with selected enhanced physical properties.

The invention claimed is:

1. A composition comprising:
   a coupling agent;
   a blowing agent;
   at least one fly ash having a plurality of ash particles being less than 1 micron in effective diameter;
   an acid scavenger;
   an anti oxidant;
   a maleic anhydride grafted carrier resin having a melt flow index selected to encapsulate said plurality of ash particles;
   a base resin; and
   wherein said coupling agent, said blowing agent, said at least one fly ash, said acid scavenger, said anti oxidant, said maleic anhydride grafted carrier resin are all combined to form a masterbatch; and
   wherein said composition further includes a blend of mineral oil mixed with stryrenic block copolymer, said blend being mixed into one of the masterbatch and said base resin.

2. The composition of claim 1 further including an impact modifier.

3. A composition comprising:
   from about 0.25 percent by weight to about 70 percent by weight of a masterbatch, said masterbatch being formed from
      about 1 percent to about 95 percent by weight of a blend of at least one fly ash,
      about 0.1 percent to about 2.0 percent by weight of an acid scavenger;
      about 0.1 percent to about 4.5 percent by weight of an antioxidant,
      about 0.1 percent to about 15 percent by weight of a coupling agent,
      about 1 percent to about 70 percent by weight of a maleic anhydride modified high density polyethylene; and
   wherein said masterbatch is combined with
      from about 1 percent to about 10 percent by weight of a styrenic block copolymer mixed with from about 0.1 percent to about 30 percent by weight of a white mineral oil;
      from about 1 percent to about 50 percent by weight of a polypropylene copolymer; and
      from about 1 percent to about 70 percent by weight of a hexene copolymer.

4. A composition comprising;
   a masterbatch formed from
      at least one fly ash having a plurality of ash particles at least about 70% of said ash particles by number being less than about 1 micron in effective diameter,
      a coupling agent,
      an acid scavenger,
      an anti oxidant, and
      a maleic anhydride grafted carrier resin having a melt flow index selected to encapsulate a plurality of ash particles;
   a base resin having selected physical properties; and
   a blend of mineral oil mixed with stryrenic block copolymer, said blend being mixed into one of the masterbatch and the base resin.

5. The composition of claim 4 wherein said masterbatch further includes an impact modifier and wherein said composition includes a melt resin blended with one of or with both of the base resin and the masterbatch.

6. A method of forming a composition, said method comprising:
   providing one or more first fly ash materials;
   mechanically processing said one or more first fly ash materials to form a fly ash filler;
   providing an acid scavenger;
   providing an antioxidant;
   providing a coupling agent;
   providing an impact modifier;
   providing a carrier resin for mixing to form a masterbatch;
   combining said fly ash filler, said coupling agent, said impact modifier, said acid scavenger, said antioxidant and said carrier resin in selected quantities to form a master batch:
   providing a base resin in a form for mixing;
   providing an oil and copolymer mixed together in a form for mixing;
   melting said base resin; and
   mixing said base resin, and said oil and copolymer in selected quantities to form a composition in liquid form suitable for processing into a desired physical form having selected impact properties.

7. A composition comprising:
   (a) a base resin comprising a first portion and a second portion;
   (b) a masterbatch comprising said first portion of said base resin, fly ash particles and one of or both of a coupling agent and a maleic anhydride grafted carrier resin having a melt flow index selected to enhance the mixing with and dispersion of the fly ash particles into said base resin;
   (c) a blend of mineral oil mixed with stryrenic block copolymer, said blend being mixed into one of said masterbatch and said second portion of said base resin; and
   (d) a fractional melt polyethylene having a melt flow index of less than 1 blended with one of and with both of the second portion of said base resin and said masterbatch.

* * * * *